United States Patent
Andreasson

(10) Patent No.: US 7,174,354 B2
(45) Date of Patent: Feb. 6, 2007

(54) SYSTEM AND METHOD FOR GARBAGE COLLECTION IN A COMPUTER SYSTEM, WHICH USES REINFORCEMENT LEARNING TO ADJUST THE ALLOCATION OF MEMORY SPACE, CALCULATE A REWARD, AND USE THE REWARD TO DETERMINE FURTHER ACTIONS TO BE TAKEN ON THE MEMORY SPACE

(75) Inventor: Eva Andreasson, Stockholm (SE)

(73) Assignee: Bea Systems, Inc., San Jose, CA (US)

(*) Notice: Subject to any disclaimer, the term of this patent is extended or adjusted under 35 U.S.C. 154(b) by 426 days.

(21) Appl. No.: 10/630,525

(22) Filed: Jul. 30, 2003

(65) Prior Publication Data

US 2004/0073764 A1 Apr. 15, 2004

Related U.S. Application Data

(60) Provisional application No. 60/400,213, filed on Jul. 31, 2002, provisional application No. 60/400,143, filed on Jul. 31, 2002.

(51) Int. Cl.
*G06F 17/30* (2006.01)
*G06F 17/00* (2006.01)
*G06F 9/44* (2006.01)
*G06F 12/00* (2006.01)

(52) U.S. Cl. ............ 707/206; 707/103 R; 717/118; 711/170

(58) Field of Classification Search .......... 707/1–2, 707/100–102, 104.1, 200, 205–206, 103 R; 717/140–142, 160, 116, 118; 709/218–220; 718/1–2; 711/170, 147–149, 152; 706/14–16, 706/25

See application file for complete search history.

(56) References Cited

U.S. PATENT DOCUMENTS 6,070,173 A * 5/2000 Huber et al. .......... 707/206

(Continued)

FOREIGN PATENT DOCUMENTS

EP 1387273 * 2/2004

(Continued)

OTHER PUBLICATIONS

Richard S Sutton, "Generalization in Reinforcement Learning: Successful Examples Using Sparse Coarse Coding", Advances in neural Information processing systems 8, 1996, pp. 1038-1044.*

(Continued)

*Primary Examiner*—Srirama Channavajjala
(74) *Attorney, Agent, or Firm*—Fliesler Meyer LLP

(57) ABSTRACT

A system and method for use with a virtual machine, including an adaptive, automated memory management process that takes decisions regarding which garbage collector technique should be used, based on information extracted from the currently active applications. Reinforcement learning is used to decide under which circumstances to invoke the garbage collecting processing. The learning task is specified by rewards and penalties that indirectly tell the RLS agent what it is supposed to do instead of telling it how to accomplish the task. The decision is based on information about the memory allocation behavior of currently running applications. Embodiments of the system can be applied to the task of intelligent memory management in virtual machines, such as the Java Virtual Machine (JVM).

20 Claims, 21 Drawing Sheets

U.S. PATENT DOCUMENTS

| | | | |
|---|---|---|---|
| 6,151,618 A * | 11/2000 | Wahbe et al. | 718/1 |
| 6,353,838 B2 * | 3/2002 | Sauntry et al. | 707/206 |
| 6,434,575 B1 * | 8/2002 | Berry et al. | 707/206 |
| 6,480,862 B1 * | 11/2002 | Gall | 707/3 |
| 6,629,113 B1 | 9/2003 | Lawrence | 707/206 |
| 6,865,657 B1 * | 3/2005 | Traversat et al. | 711/170 |
| 6,892,212 B2 * | 5/2005 | Shuf et al. | 707/206 |
| 6,912,553 B1 * | 6/2005 | Kolodner et al. | 707/206 |
| 6,941,410 B1 * | 9/2005 | Traversat et al. | 711/6 |
| 2002/0198854 A1 | 12/2002 | Berenji | |
| 2004/0073764 A1 * | 4/2004 | Andreasson | 711/170 |
| 2005/0102670 A1 * | 5/2005 | Bretl et al. | 718/1 |

FOREIGN PATENT DOCUMENTS

| | | | | |
|---|---|---|---|---|
| EP | 1659496 | * | 5/2006 | |
| WO | WO 99/00730 | * | 1/1999 | 12/2 |
| WO | WO 01/97042 | * | 12/2001 | 12/2 |
| WO | WO 02/23345 | * | 3/2002 | |

OTHER PUBLICATIONS

Chris,Gaskett et al. "reinforcement learning applied to the control of an autonomous underwater vehicle", AuCRA , 1999.*

Richard S Sutton, et al. "Reinforcement learning 1: Introduction", 1998, pp. 1-15.*

Philippe Preux, Propagation of Q-values in Tabular TD (lambda), Proc. 13th european conference on Machine learning (ECML), 2002.*

Steven J Bradtke et al. Reinforcement learning methods for continuous-Time markov decision problems, Advances in Neural information processing systems, 1994, pp. 1-7.*

Ronald Parr et al. "Reinforcement learning with Hierarchies of Machines", advances in neural information processing systems, 1997.*

Eva Andreasson et al. "to collect or not to collect?", JVM '02, 2002 pp. 27-40 of the proceedings 18 pages.*

Jette Randlov, "Solving complex problems with reinforcement learning", Ph.D Thesis, CATS, Niels Bohr instutute, Faculty of science, University of Copenhagen, Sep. 2001, pp. 1-102,and 148-150.*

Makarevitch,B, "CDMA admission control based on reinforcement learning", VTC 50th conference, 1999, vol. 5, pp. 2830-2834*

Blackburn SM et al. "starting with termination: a methodology for building distributed garbage collection algorithms", 24th australasian ACSC 2001 computer science conference, 2001, pp. 20-28.*

Lars T Hansen et al. "An experimental study of renewal-older-first garbage collection", ICFP'02, Oct. 2002, pp. 247-258.*

* cited by examiner

```
Initialize θ arbitrarily
Repeat for each episode:
s ← initial state of episode
t ← 0
For all a ∈ A(s) (all possible actions a to take from state s)
$F_a$ ← set of features present in s = $[s_1, ..., s_n]$ and a = $[a_1, ..., a_m]$
$Q_a$ ← $\sum_{i \in F_a} \theta_i$ *
a ← $argmax_a Q_a$ **
with probability ε = 1/t: a ← random action ∈ A(s)
Repeat for each step of the episode:
Take action a
Observe r (the reward)
Observe s' (the next state)
For all a' ∈ A(s')
$F_{a'}$ ← set of features present in s' = $[s'_1, ..., s'_n]$ and a' = $[a'_1, ..., a'_m]$
$Q_{a'}$ ← $\sum_{i \in F_{a'}} \theta_i$ *
a' ← $argmax_{a'} Q_{a'}$ **
with probability ε = 1/t: a' ← random action ∈ A(s')
θ ← θ + α[r + γQ(s', a') - Q(s, a)]$\nabla_\theta$Q(s, a, θ),
where Q(s', a') = $Q_{a'}$ and Q(s, a) = $Q_a$
a ← a'
t ← t + 1
Until S' is the terminal state
Until eternity
* For each action-state pair there will be an estimate of the value of the pair, based on the sum of the values in θ
at indexes corresponding to the features present in s, a.
** Find the highest state-action value for this state and choose the corresponding action.
```

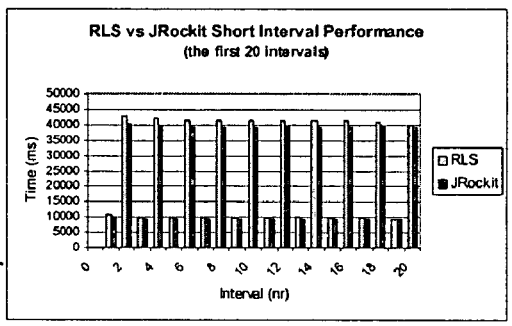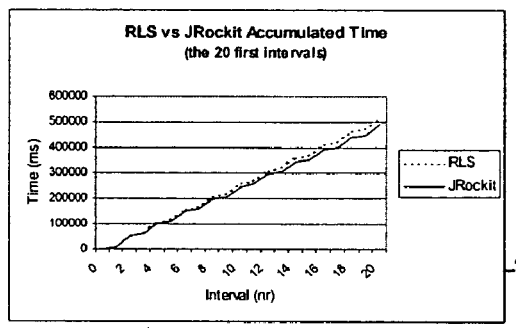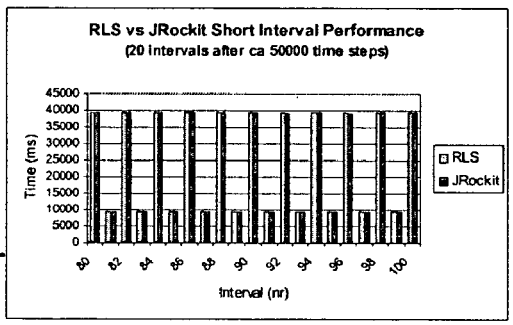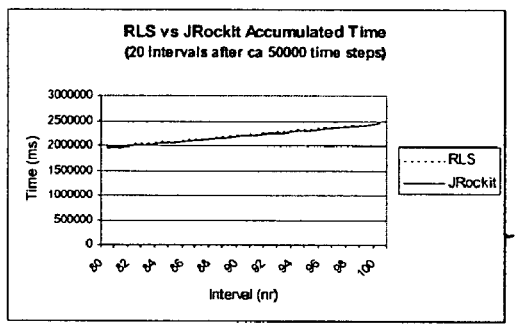
FIGURE 10

SYSTEM AND METHOD FOR GARBAGE COLLECTION IN A COMPUTER SYSTEM, WHICH USES REINFORCEMENT LEARNING TO ADJUST THE ALLOCATION OF MEMORY SPACE, CALCULATE A REWARD, AND USE THE REWARD TO DETERMINE FURTHER ACTIONS TO BE TAKEN ON THE MEMORY SPACE

CLAIM OF PRIORITY

This application claims the benefit of U.S. Provisional Application No. 60/400,143, filed Jul. 31, 2002, and claims the benefit of U.S. Provisional Application No. 60/400,213, filed Jul. 31, 2002, both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is generally related to memory management in computer systems, and particularly to a system and method of using reinforcement learning for memory management in computer systems and in virtual machines.

BACKGROUND

In a computer system, the ability to control the allocation of memory resources is vital to the successful operation and scalability of the computer system as a whole. Software applications run more efficiently in environments in which steps are taken to proactively manage available memory resources to ensure that only those entities that are currently being used are stored in memory, while little-used entities are cleanly removed. In some systems, including for example the Java Virtual Machine, the system or virtual machine performs a garbage collection from time to time, meaning in principle that the virtual machine scans the entire memory and finds which objects have been stored in the memory and which objects the program can no longer address. These parts of the memory are returned for later use.

However, current systems of garbage collection are limited in their abilities to clean the memory, and do not adequately respond to variations in the underlying system. What is needed is a more dynamic process that can take into account variations in the system, and which may be incorporated into existing computer system and virtual machine environments.

SUMMARY OF THE INVENTION

In accordance with one embodiment, the invention uses machine learning methods to enhance garbage collection in a computer system or virtual machine environment such as a Java™ Virtual Machine (JVM). The invention can also be used to increase performance of a conventional garbage collector such as in the BEA Systems, Inc. JVM product JRockit™, or in other virtual machine environments. Other embodiments that utilize variations and improvements may be developed within the spirit and scope of the invention.

Reinforcement learning uses a function to describe the expected future discounted rewards in a particular state or for a particular state action pair. This function is referred to as the Q-function or the Q-value function. It will also be referred to as the state-action value function or the value function. The usage of the two latter terms depends on the specific meaning that is intended.

The invention addresses the question of how to design and implement an automatic and learning decision process for more dynamic garbage collection in a modern JVM. A primary goal is to enhance the design of modern JVMs by means of learning techniques in order to make them more efficient, dynamic and flexible. A more adaptive JVM is desirable since it will result in improved performance and faster execution of applications based on Java™.

A JVM renders possible for Java byte code (the compiled code for Java applications) to be translated and executed on any platform. Another important function of the JVM is to handle the automatic memory management, i.e. the garbage collector. Depending on the application environment the garbage collector affects the performance of the JVM significantly.

The present invention can be used to enhance the current garbage collection process in a system or JVM such as JRockit™. Instead of letting static variables decide which garbage collector technique to use and how to apply it, the system utilizes an automatic, learning decision process that takes the decision while the application is running.

In accordance with one embodiment a reinforcement learning method called on-policy SARSA is used. In order to approximate the value function for continuous states, a gradient-descent function approximation has been explored. These include both a linear approximation and a non-linear approximation function.

SARSA was chosen because it is an on-policy temporal-difference method. On-policy evaluation, namely following and improving the behavior policy simultaneously, is desirable insofar as the system for solving the concrete problem needs to improve its performance during run time. Tile coding has been chosen for extracting state representations of continuous state feature values. There are other possible approaches for achieving a proper function.

In accordance with one embodiment, the invention comprises a system for memory management comprising: a computer system or virtual machine having a memory or storage space; and, wherein reinforcement learning logic is used to control the management of the memory storage space. Other embodiments and implementations may be developed within the spirit and scope of the invention.

BRIEF DESCRIPTION OF THE DRAWINGS

FIG. 9 shows a code listing in accordance with an embodiment of the invention, including pseudo code used to address the garbage collection problem.

FIG. 10 shows performance graphs of an RLS-based system in accordance with an embodiment if the invention compared to a regular JVM for short intervals.

DETAILED DESCRIPTION

Figure 1:
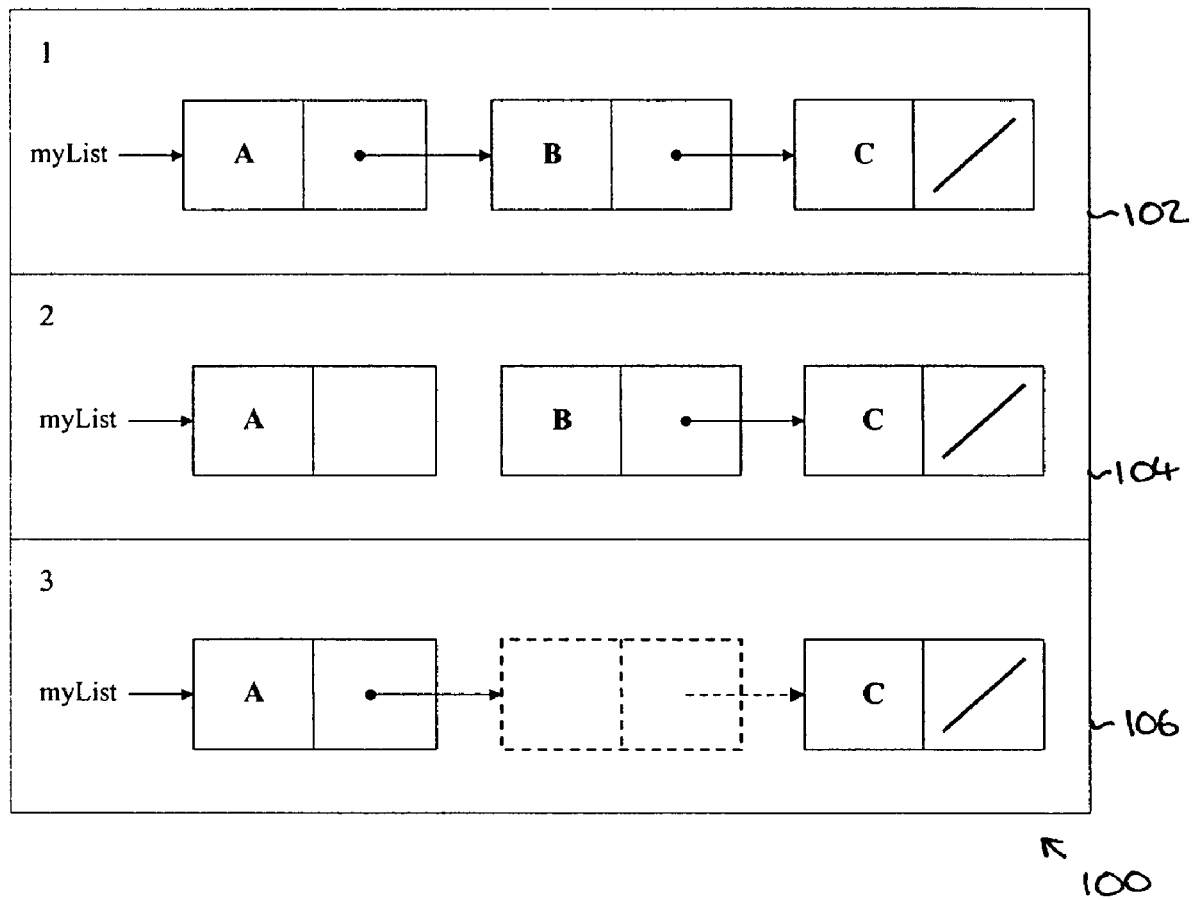
FIG. 1 shows an illustration of a memory including allocations.

In accordance with one embodiment, the invention uses machine learning methods to enhance garbage collection in a computer system or virtual machine environment such as a Java™ Virtual Machine (JVM). The invention can also be used to increase performance of a conventional garbage collector such as in the BEA Systems, Inc. JVM product JRockit™, or in other virtual machine environments. Other embodiments that utilize variations and improvements may be developed within the spirit and scope of the invention.

As used herein, the terms approach, method, algorithm and function are used for different meanings. Approach is a way of addressing a problem. A method is a general notion for a way of solving a special kind of problems, while an algorithm is a concrete, specified recipe for solving a specific problem. A function is specific code performing a well-defined task or computation.

Reinforcement learning uses a function to describe the expected future discounted rewards in a particular state or for a particular state action pair. This function is referred to as the Q-function or the Q-value function. It will also be referred to as the state-action value function or the value function. The usage of the two latter terms depends on the specific meaning that is intended.

The invention addresses the question of how to design and implement an automatic and learning decision process for more dynamic garbage collection in a modern JVM. A primary goal is to enhance the design of modern JVMs by means of learning techniques in order to make them more efficient, dynamic and flexible. A more adaptive JVM is desirable since it will result in improved performance and faster execution of applications based on Java™.

A JVM renders possible for Java byte code (the compiled code for Java applications) to be translated and executed on any platform. Another important function of the JVM is to handle the automatic memory management, i.e. the garbage collector. Depending on the application environment the garbage collector affects the performance of the JVM significantly.

The JVM JRockit™, by BEA Systems, Inc./Appeal Virtual Machines, was designed recognizing that all applications are different and have different needs. Thus, a garbage collection technique and a garbage collection strategy that works well for one particular application may work poorly for another. To provide good performance across many applications, various garbage collection techniques with different characteristics have been implemented. However, a particular garbage collection technique can never achieve its optimal performance if one lacks a strategy of how and when to apply it. This observation motivates the investigation of better and more adaptive strategies.

The present invention can be used to enhance the current garbage collection process in a system or JVM such as JRockit™. Instead of letting static variables decide which garbage collector technique to use and how to apply it, the system utilizes an automatic, learning decision process that takes the decision while the application is running.

The following description also details how an automatic, learning decision process can be designed to improve the garbage collecting system in a product such as JRockit™ such that currently existing garbage collectors operate more dynamically and effectively.

In accordance with one embodiment a reinforcement learning method called on-policy SARSA is used. In order to approximate the value function for continuous states, a gradient-descent function approximation has been explored. These include both a linear approximation and a non-linear approximation function.

SARSA was chosen because it is an on-policy temporal-difference method. On-policy evaluation, namely following and improving the behavior policy simultaneously, is desirable insofar as the system for solving the concrete problem needs to improve its performance during run time. Tile coding has been chosen for extracting state representations of continuous state feature values. There are other possible approaches for achieving a proper function.

The following glossary describes terms that are used throughout the text:

Actions: actions interact with the environment and are chosen based on a behavior policy from each state according to a state-action value function.

Beliefs: see model.

Conservative: the word exact is used for the approach where pointers to objects do not need exact identification.

Concurrent: garbage collection performed "little at a time", where "little at a time" means one garbage collection step at a time, is called concurrent garbage collection.

Dead: an object is dead if it cannot be reached from a running program.

Dirty: an object that has been changed during a concurrent phase of a "mostly-concurrent" garbage collector is said to be dirty and must hence be traced again before sweeping.

Exact: the word exact is used for the approach where pointers to objects need exact identification.

Flip: to flip is to change the semi-space to be scanned of a copying garbage collector from the one recently scanned to the non-recently scanned semi-space.

Fragmentation: scattered memory pieces that cannot satisfy a certain memory need although the free memory in the heap in total would.

Free-list: the free-list is a linked list of all free blocks of memory available in the heap.

Garbage collection: an automatic memory-deallocating process is called a garbage collection.

Garbage: from a running program non-reachable objects

Gene: each element of an input string or array to a genetic method is called a gene.

Goals: see model.

Heap: memory is allocated in the heap.

Hypothesis: see model.

Incremental: garbage collection performed "little at a time", where "little at a time" means one area of the heap at a time, is called incremental garbage collection.

Individual: the input of a genetic method is called an individual.

Live: an object is live if it can be reached from a running program.

Mark-and-compact: a garbage collection approach that uses the mark-and-sweep approach, but tries to move objects close together to prevent fragmentation.

Mark-and-sweep: a garbage collection approach that marks all live objects and then collects the non-marked objects.

Markov Decision Process: a reinforcement learning task that fulfils the Markov property is called a Markov Decision Process (an MDP).

Markov property: an input signal succeeding in providing all relevant information for making a correct decision has the Markov property.

Model: a model is the beliefs about the environment of a learning system.

Off-policy: when following one policy and updating another an off-policy approach is used.

On-policy: when following and updating the same policy an on-policy approach is used.

Parallel: garbage collection performed in parallel, performed in a multi-processor environment, is called parallel garbage collection.

Policy: a policy (or behavior policy) defines the behavior of the system at a given time.

Pre-cleaning: step three of a "mostly-concurrent" garbage collector includes checking objects that are marked dirty, this is called pre-cleaning.

Q-value function: see State-action value function.

Reward: a reward is calculated by a reward function and corresponds to an evaluation of the feedback from the environment after a certain action is performed.

Roots: objects that the running program stores in registers or on the stack are known to be live. Objects that are known to be live are called roots.

State-action value function: the state-action value function is the function that calculates the value of taking a certain action from a certain state.

States: states are representations of the environment, the input of a reinforcement learning system.

Stop-and-copy: a garbage collection approach that divides the heap into two semi-spaces and collect one semi-space at a time by moving all live objects in one semi-space into the other and then flip.

Supervised learning: supervised learning is learning from examples provided by a knowledgeable external supervisor.

Unsupervised learning: unsupervised learning is learning through "trial and error" and improves behavior through a reward function (feedback from the environment).

Update: a learning system can evaluate and improve the policy based on the reward and thereby make better decisions further on.

Value function: see State-action value function

Introduction

A key feature of human intelligence is the ability to learn from experience. Humans and animals interact with their environment and adapt their behavior. Therefore a basic requirement of any artificial intelligent systems is the ability to learn—especially through interaction with the surrounding environment.

A common definition of machine learning is a process wherein a change in the system allows it to perform better the second time on repetition of the same task, or on another task drawn from the same population.

Another definition of machine learning is a method that learns within its domain, by searching domain specific concepts to reach more general concepts. The generalization contributes to the ability to handle new concepts within the domain.

Machine learning methods can generally be classified according to three different categories: supervised learning, learning with a critic and unsupervised learning.

Supervised Learning Method

Supervised learning can be defined as earning from examples provided by a knowledgeable external expert. Therefore, a supervised learning method needs a set of training examples. It also needs a model that represents its knowledge about the domain that is updated during training. In the machine learning literature this model is also referred to as a hypothesis.

Training patterns for supervised learning methods are composed of two parts, an input vector and an associated output. Training consists of presenting a set of inputs together with a set of desired responses as output. The method processes the input information and updates the model according to the error that is defined as the difference between the desired response and the actual output. These errors used to determine changes in the hypothesis of the method according to a learning rule.

Representative examples of supervised learning methods include decision trees and neural networks.

Decision Trees

The hypothesis in systems using decision trees consists of nodes forming a tree structure. The input set contains features that describe an object or a situation. The output consists of yes and no answers (or any other binary decision). Due to the binary nature of inputs and outputs decision trees form Boolean functions. The task of a decision tree is to decide to which class the object or situation belongs to according to its observable features. To train a tree, known examples with known outcomes are needed to learn which features are associated with which class.

Neural Networks

Neural networks consist of a set of computational units, connected via weighted links. The hypothesis is represented by the weights, which strengths are adapted during training. The network-units operate in a distributed and parallel fashion. The hypothesis is represented by the current values of the weights in the network. An input is presented to the network and the difference between the desired output and the actual network output is observed. By making small adjustments to the weights, the network output becomes more similar to the training data. The goal of these adjustments is to minimize the summed squared error over the training set.

Supervised learning methods are very efficient when the desired behavior is known in form of input-output training examples. If the set of training examples is large enough and representative for the domain the networks can be trained efficiently and are able to successfully generalize correctly to previously unseen examples.

If training examples are difficult or costly to obtain or not available at all supervised learning methods cannot be applied. Still it would be possible for a supervised learner to imitate the behavior of an existing garbage collector, but this will not result in any improvement of its performance. Therefore, the primary goal herein of optimizing the decision process cannot satisfactorily be achieved with a supervised learning approach alone.

Often it is necessary for the system to learn online, in case training examples become available as the system is running, rather than in batch mode in which case the entire data set is available prior to training. Back propagation is an example of a learning method that in principle is capable of online learning, whereas other supervised methods such as decision trees can only be trained in batch mode.

Learning with a Critic Method

Learning with a critic means that no explicit examples of correct input output pairs are needed for training, but merely that a "critic" tells the system whether it performs well or poorly.

A "learn with a critic"-system uses "trial and error"-search to learn the best action to take in a given situation. This is realized through a reward system constituting the critic. The objective is to choose those actions that maximize the future rewards. The rewards for actions are not necessarily immediate but might be delayed. Therefore, the system has to address the temporal credit assignment problem, namely to identify those states and actions that in the long run will result in optimal rewards.

In contrast to the earlier described supervised learning methods which learn based on the error, learning with a critic involves interacting with an initially unknown environment and observing the consequences of the actions.

Two examples of methods that learn with a critic include genetic algorithms and reinforcement learning methods.

Genetic Algorithms

Genetic algorithms are search and optimization methods that mimic the processes that occur in natural evolution. They operate with a population of candidate solutions to which random modifications are applied. Individuals are represented as bit strings, which encode parameters of a possible solution. By selecting better individuals for reproduction to the next generation the quality of the individuals in the population improves over time. Although based on the same principle as genetic algorithms other evolutionary algorithms employ different representations and genetic operator. In the case of genetic algorithms the fitness function plays the role of the critic. Individuals of the same generation are evaluated according to the fitness function. The best-suited individuals of a generation are selected to generate offspring to the next generation.

Genetic algorithms are usually slow and require a large number of fitness evaluations. They only indirectly use the information provided by the critic to update their behavior. If the learning takes place in the real environment, poorly adapted individuals might significantly deteriorate the overall performance of the system for unacceptable long periods of time. The fitness function only considers the accumulated reward over time, but does not relate the reward to particular states and actions. The genetic algorithm maintains no explicit model of states and therefore information available for direct learning of good actions and states cannot be utilized. In the type of decision problems relevant for this project, genetic algorithms learn much slower than for example reinforcement learning algorithms presented in the next section.

Reinforcement learning methods solve a class of problems known as Markov Decision Processes (MDP) or reinforcement problems. If it is possible to formulate the problem at hand as an MDP, reinforcement learning provides a suitable approach to its solution.

A reinforcement learner observes a state (situation) and decides what action to take in that particular situation. The choice of action depends on a state-action value function, $Q(s, a)$ that calculates the value of taking an action a in state s. The q-value reflects the expected future discounted rewards of taking action a in state s and following an optimal policy afterwards. The action chosen is the one with the highest Q-value within the current state. As a result of the action taken by the reinforcement learner the environment transitions to a new state provides a reward value as feedback. Based on the observed reward and the state-action value of the new state the reinforcement learning method updates its beliefs about the state-action value of the previous situation. The reward function constitutes the critic.

More formally stated, a policy is a mapping from states to actions $\pi: S \times A \to [0,1]$, in which $\pi(s, a)$ denotes the probability with which the reinforcement system chooses action a in state s. As a result of the action taken by the agent in the previous state, the environment transitions to a new state $s_{t+1}$. Depending on the new state and the previous action the environment might pay a reward to the agent. The scalar reward signal indicates how well the agent is doing with respect to the task at hand. However, reward for desirable actions might be delayed, leaving the agent with the temporal credit assignment problem, of figuring out which actions lead to desirable states of high rewards. The objective for the agent is to choose those actions that maximize the sum of future discounted rewards:

$$R = r_t + \gamma r_{t+1} + \gamma^2 r_{t+2} \ldots$$

The discount factor $\gamma \in [0,1]$ favors immediate rewards over equally large payoffs to be obtained in the future, similar to the notion of an interest rate in economics.

Usually neither the state transition nor the reward function are known to the reinforcement system, neither do these functions need to be deterministic. In the general case the system behavior is determined by the transition probabilities $P(s_{t+1}|s_t, a_t)$ for ending up in state $s_{t+1}$ if the agent takes action $a_t$ in state $s_t$ and the reward probabilities $P(r|s_t, a_t)$ for obtaining reward r for the state action pair $s_t, a_t$.

Whereas for instance dynamic programming requires a model of the environment for computing the optimal actions, reinforcement learning methods are model free and the reinforcement system obtain knowledge about the environment through interaction. The agent explores the environment in a trial and error fashion, observing the rewards obtained of taking various actions in different states. Based on this information the agent updates its beliefs about the environment and refines its policy that decides what action to take next.

To maximize the reward overtime, a learning system must choose the most valuable action. The problem is that the best action may be an action not yet tried and evaluated. Finding a balance between making decisions on experience by choosing the best evaluated action so far and finding new alternatives that might be better than the known ones, is a difficult problem when designing and using reinforcement learning systems. The "exploration vs. exploitation"-issue is discussed below.

Another important issue to consider is the choice of reward function, since it affects the behavior of the system. The proper definition of the reward function therefore plays an important role in the design of reinforcement learning systems.

Unsupervised Learning Method

In contrast to the supervised learning and learning with a critic methods described above, which is applicable only when the outcome is known or if information is available about what constitutes good or bad behavior, an unsupervised learning method needs no hint at all of what the correct outcome should be. Instead they cluster the input data according to the similarity of features and thereby identify the underlying structure of the input domain. Often unsupervised learning methods are used to preprocess the data before a supervised learning algorithm is applied.

These kinds of methods are not of particular interest in the present case since there is a need of control in a JVM system. For instance the system should never run out of memory, or at least learn quickly not to run out of memory, hence a system handling the problem must be controlled in some way.

Garbage Collection

Some programming languages use explicit memory allocation and deallocation, for instance C and C++. This demands that programmers using such languages have a lot of knowledge of how a computer is built and how it works. If the programmer would lack this knowledge when constructing a computer program it could result in a computer program with memory leaks and dangling references.

FIG. 1 shows an illustration of a memory 100 including allocations. At the top an allocated list 102 is shown. In the middle a memory leak 104 is illustrated. At the bottom a memory leak and a dangling reference 106 are illustrated. Memory leaks are memory that is referenced by deallocated memory. A dangling reference is a reference to memory that has been deallocated. These problems cause the computer program to eventually crash, or even worse, to keep running but calculating wrong values.

To simplify for programmers, program languages were developed that did not use explicit memory allocation. The first high-level, compiler-using language was Fortran (1957). Other programming languages based on the same idea developed later, for instance Lisp, Small Talk and Java.

Implicit memory allocating languages need a system that handles the freeing of objects that are no longer used by the running program. A system that handles this is called a garbage collector, since it takes care of garbage caused by the running program.

One purpose of garbage collection is to relieve the programmer from the burden of discovering memory management errors by ensuring that these errors cannot arise, i.e. garbage collection frees the programmer from having to keep track of when to free allocated memory, thereby preventing many potential bugs and headaches.

One difficulty with garbage collecting is to decide which objects are no longer alive (dead). An object is dead if no references to that object exist. If there still are references to an object it is said to be live. For instance, an object-oriented program uses the stack and registers for storing class variables (among other things). The objects that the running program stores are certain to be live. Objects known to be live are referred to as roots. By following the references from the roots all other live objects can be found.

Another difficulty with garbage collection is to prevent heap fragmentation. That is, preventing the free memory spaces of the heap of becoming too small and too scattered so that new objects cannot be allocated, although the total amount of free memory may be sufficient.

There are mainly two basic different techniques that a garbage collector can rely on: reference counting collectors and tracing collectors.

Garbage Collection Using Reference Counting Collectors

Reference counting collectors perform the garbage collection by counting and storing the amount of references to an object. When an object is initiated the reference number is set to one. For each new change in the amount of references to an object, the reference count is increased or decreased. If the amount of references to an object becomes zero, the object is freed and all the objects that the garbage collected object refers to have their reference counts decreased. These decreases may, in turn, lead to garbage collection of other objects.

The advantage with this method is that there is no need for scanning the heap for live objects. On the other hand this approach has difficulties handling cyclic structures and the updating of references must be synchronous.

Garbage Collection Using Tracing Collectors

Figure 2:
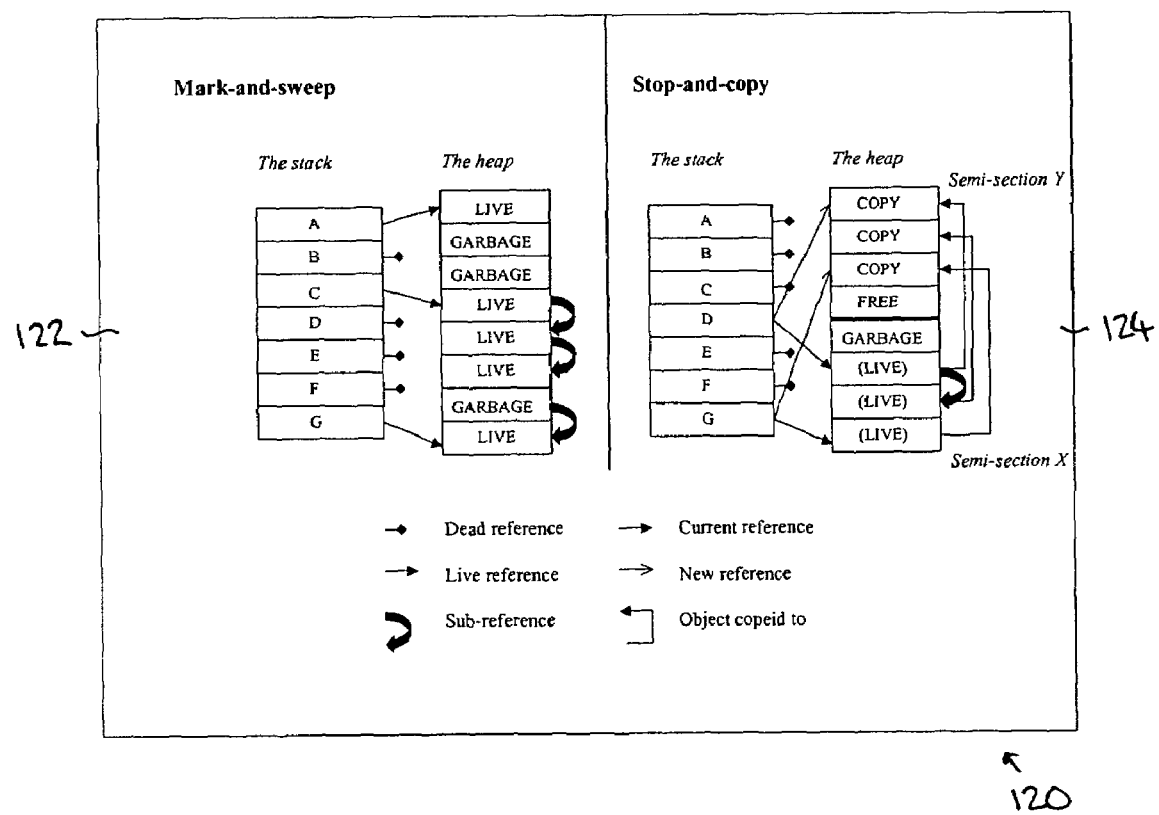
FIG. 2 shows an illustration of a garbage collection technique.

A typical tracing collector is the mark-and-sweep collector. FIG. 2 shows an illustration of a garbage collection technique 120 including mark-and-sweep 122, and stop-and-copy 124. Mark-and-sweep collectors mark all reachable objects to be live and the remaining objects are assumed to be garbage. Stop-and-copy collectors divide the heap into two semi-spaces and copy all live objects from one semi-space to the other before sweeping the recently scanned semi-space. It uses a technique that comprises finding all from the running program reachable objects, i.e. all live objects. When a live object is found it is marked. The marking can be performed in several ways, for example by setting a certain bit in the header of the object. When the collector has found all live objects in the heap and marked them it is time for the next step, which is sweeping all unmarked objects away—freeing their memory.

A problem using mark-and-sweep is that it causes fragmentation of the heap. That is, scattered memory pieces that cannot satisfy a certain memory need, although the free memory in the heap in total would. To deal with the problem of a fragmented heap, a compacting mark-and-sweep has been developed. This type of collector is called mark-and-compact. During sweeping, the mark-and-compact collector tries to move all remaining, live objects towards one end of the heap to get rid of small free memory spaces that causes fragmentation.

Another kind of tracing collector is the copying garbage collector, stop-and-copy 124. Copying collectors divide the heap into two semi-spaces, X and Y. The scanning for garbage begins e.g. in X. If an object is alive, i.e. can be reached from the program, the garbage collector will copy it into Y and then start scanning for the next live object in X. When the garbage collector is through scanning X, it may start scanning Y for live objects, copying them into X. It follows that objects may be allocated in only one semi-space at a time. To change from scanning X to scanning Y is referred to as flip.

The mark-and-compact technique is in many situations more time consuming than stop-and-copy. However, when it comes to large objects or few non-living objects in the heap the stop-and-copy collector is worse than the mark-and-compact collector, since copying takes a lot of effort in those situations. Another disadvantage using stop-and-copy is that the heap uses only half its capacity, since it has to be divided into two equal semi-spaces and use only one of them at a time for allocation.

The above described, different techniques can be varied in many ways. Unfortunately there is no "best solution". One solution works better for certain application areas and others work better under different circumstances. The problem is that existing applications using JVMs and garbage collectors are different such that it is hard to design and implement a garbage collector that works perfectly in all situations.

Below are some features that have been developed for fulfilling different needs in garbage collecting that can be varied to some extent. A briefing of some important features is given, as well as the effects a change in these features have on the performance of the garbage collector.

Handle Based Pointers and Direct Pointers

Direct pointers are pointers that point directly at the objects. A reference to the object contains the explicit address of the object.

Handle based pointers, on the other hand, are pointers that point at a table handle. The contents of the table space of that handle are a reference to an object. Handle based pointers point indirectly at the object.

The use of this kind of look-up table simplifies the updating of object pointers. It is easier since only the table needs updating, not the pointers to the objects. One problem is that the table uses much more memory than direct pointers. Another problem is that it takes more time to run the program since using the look-up table increases the time for locating an object.

Identification of Pointers

Pointers need exact identification if objects are relocated, as in the case of copying. This approach is thus referred to as exact.

When objects are not moved, pointers do not need exact identification. A non-exact approach can be used, the so-called conservative approach. All live objects are found anyway, along with a few non-living objects. This approach is important, since it allows programs that were written without garbage collection in mind to use garbage collection anyway.

Moving Objects

In systems where copying collectors or compacting collectors are used objects may be moved.

Small objects are easy to move, and when moving them closer together in the heap fragmentation is prevented. By moving objects, the cache locality is also improved, which means referring objects are situated closer to each other.

Disadvantages appear when the moving concerns large objects. To move large objects is very ineffective since the process of moving them affects the total garbage collecting process time considerably. Another disadvantage with moving large objects is that all objects pointing at an object to be moved need to be found. In the worst case this means a scan of the entire heap.

Generated Garbage Collection

Figure 3:
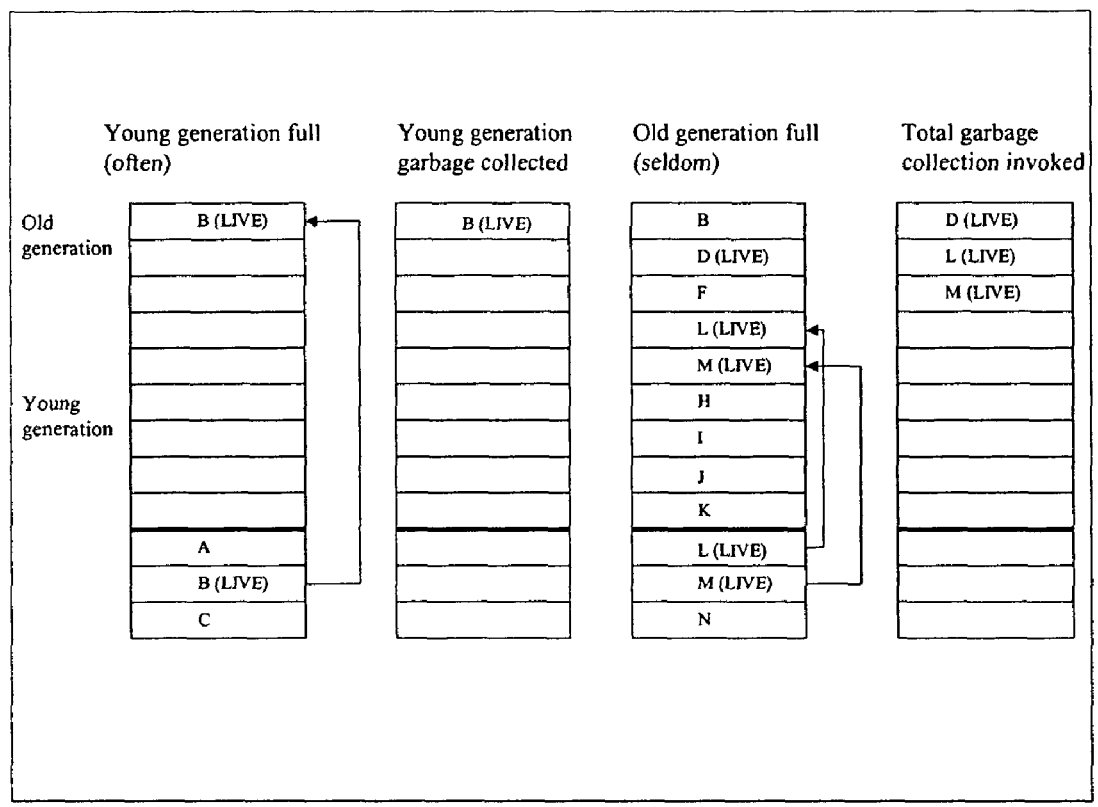
FIG. 3 shows an illustration of a generational garbage collector.

Most objects are considered to die young. The solution of not having to continue scanning long-living objects is to divide the heap into generations. Old objects are stored in a certain part of the heap and young in another. FIG. 3 shows an illustration of a generational garbage collector 140. The generational garbage collector divides the heap into an older and a younger generation. During garbage collection of the younger generation all live objects are promoted to the older generation. When the older generation is full a complete garbage collection is invoked. In this case the old generation uses a compacting technique.

The region of the heap where the young objects are stored is small and hence garbage collected more frequently, while the region of the heap, where older objects are stored, is garbage collected more seldom. Objects that survive a certain number of garbage collections in a younger generation are promoted to an older generation. This approach enhances the interruption time of the running program and the garbage collection in total.

To be able to garbage collect a younger generation without collecting older generations as well, all objects in older generations are considered to be alive. Another important issue is to keep track of which old objects that are pointing at younger objects, so that the referenced younger, live objects will not be garbage collected.

One issue to consider, when it comes to generational garbage collection, is how fast an object ages, i.e. is promoted to the next generation. The promotion rate has to be decided. A low rate makes the garbage collection sessions faster, but may also cause promotion of comparatively young objects and accordingly a lot of garbage in older generations, which is undesirable. A high promotion rate gives more stable old generations, but also longer breaks for collecting the youngest generation. The trade-off problem with the promotion rate is often called the "pig in the python"-problem in which the python attempts to swallow a pig as its prey. Collection effort will be wasted as a large and long-living object survives and is promoted from generation to generation. The similarity with the "pig in the python" is the immobilization of the snake as it digests a much too large prey—the pig.

There is no obligation for the different generations to use the same garbage collection technique. By using different techniques to garbage collect different parts of the heap, process time may be shortened and other desired goals may be achieved.

Incremental Collection

An incremental collector divides the heap into sections and collects one section at a time. One consequence of this is that only a small amount of the garbage—the garbage of one section of the heap—is collected at a time and that it may not be enough to satisfy the allocation needs of the program. A resulting positive feature is that an incremental garbage collection does not cause such a large break in the running program as a complete garbage collection of the heap might do. This technique is seldom used because it is very hard to implement.

Concurrent Collection

Another effective, but also hard to implement garbage collector technique is the concurrent approach. A concurrent garbage collector works in a certain thread by itself, at the same time as the program. To work "at the same time as the program" means that the program and the collector take turns executing instructions.

Both the incremental and the concurrent collectors collect little garbage at a time. The difference between the two approaches is that incremental "little at a time"-approach means little garbage is collected at a time, where little refers to a small area of the heap. Concurrent "little at a time"-approach, on the other hand, means little garbage collection at a time, i.e. the garbage collection is divided into steps and only one step at a time is performed. In other words little, but not necessarily complete, garbage collection is performed at a time. Garbage collection steps of a mostly-concurrent garbage collector are described below. Consequently concurrent collectors need to consider allocations made by the program in between the step executions of the collector. Another important issue is to keep track of the changes made by the running program in order to be able to update all pointers correctly.

This technique is hard to implement, but is very effective according to total interruption time of the running program. The alternative is to stop the program and complete the garbage collection and then return to the program, which would cause a much more noticeable interruption.

Parallel Collection

The parallel collection technique may be used when the system where the collector is being used has more than one processor. Only in this case would it be possible for several threads to really work at the same time, i.e. in parallel.

Advantages with this technique are that the garbage collector may work concurrently and incrementally on each processor and thereby shorten the total time of the garbage collection, i.e. shorten the interruption time in the running program.

An important factor to consider when it comes to parallel garbage collection is the need of synchronization of the garbage collecting threads. It is also important to distribute the work to the separate processors in an efficient and fair way.

"Mostly-concurrent" Garbage Collection

The JRockit™ virtual machine from BEA Systems, Inc. is one example of a Java Virtual Machine (JVM) that has a "mostly-concurrent" garbage collector that is based on five steps. The first step includes stopping the running program and finding all objects directly reachable from the roots.

After the first step, the running program is allowed to run again, while the garbage collector marks all reachable objects from the found roots. At the same time the garbage collector keeps track of all changes made by the running program during this concurrent phase. The changed objects are marked dirty, which means that those objects must be checked again before sweeping.

The third step contains pre-cleaning. Pre-cleaning involves concurrently checking dirty objects and also keeping track of new changes. Hopefully the checking of dirty objects will take less time than it will take for the running program to allocate many new objects (change the heap). The purpose of pre-cleaning is to remove some work pressure from step four, which causes a second stop of the running program.

Step four is the final marking pause and includes checking all remaining, dirty objects as well as the roots once again. If any live object is found, it is marked as the earlier found living objects.

The fifth and last step is the sweeping phase. In the sweeping phase all non-marked objects are freed and returned to the free-list. The free-list is a linked list of free memory sections in the heap.

Optimization Through Minimization

The following sections describe desired goals regarding the performance of a garbage collector.

Each of the earlier described techniques and features can be combined and varied in many ways to accomplish these goals in various environments. A major challenge for programmers is to design and implement a garbage collector that is able to achieve the goals in a very dynamic and sometimes unknown environment.

Memory Blocking

The garbage collector has to make sure that the running program never runs out of memory. The goal is to free enough memory and to compact the blocked memory in order to satisfy the allocation needs of the running program. The desire is to keep the memory blocking as low and as compact as possible.

Breaks

A major issue is to have as few and as short interruptions (breaks) as possible in the running program. A break is when the program running is stopped completely.

Total Process Time

In a broader perspective the total occupied process time is a factor for minimization, just as the other factors described above. Total process time does not need to be an issue in the case with a parallel garbage collector if the throughput is satisfying enough.

Thus, the reinforcement learning methods are able to learn from interaction with the environment and time-delayed feedback. As it is difficult, if not impossible, to obtain direct examples of the "best possible" garbage collection decisions, supervised learning methods are not suitable for the optimization problem at hand. Since the objective is to optimize the garbage collecting process based on the observed memory states and performance during runtime, reinforcement learning methods can be used.

System Design and Implementation

An embodiment of the present invention provides a system that implements a learning decision process for more dynamic garbage collection in a modern JVM. In the following sections the system is described more concretely in terms of more specific objectives of dynamic garbage collection, the type of reinforcement learning algorithm that is used to achieve those objectives, and the information that it processes.

Concretizing the problem leads to a more understandable justification of why reinforcement learning is a suitable solution method. This also contributes to a less abstract explanation of how to solve the problem in practice. The performance of the adaptive decision process with respect to the concrete problem can be measured and compared to current state of the art garbage collecting heuristics. In order to concretize the problem we can look at one particular decision in a garbage collector, namely the decision of when to garbage collect.

This is an important decision in a JVM as it affects the run-time performance of the application. If garbage collection is invoked too late the running program runs out of memory. Neither must it start too early, as this causes unnecessary garbage collections, which consumes computational resources otherwise available to the running program.

The solution to this concretized problem provides valuable insights to the general problem of more dynamic garbage collection. In accordance with one embodiment of the invention the concrete problem that is solved refers to the above specified, concrete task, namely to design a learning decision process for deciding when to garbage collect.

As discussed above, reinforcement learning methods are a standard way to solve Markov Decision Processes (MDP). Therefore, by formulating the problem of garbage collection as an MDP, reinforcement learning can be applied to solve it.

A system has the Markov property if its future evolution only depends on the current state but not its history. A reinforcement learning task that satisfies the Markov property is called an MDP. More formally: if t indicates the time step, s is a state signal, a is an action and r is a reward, then the system has the Markov property if and only if for all states:

$$Pr\{s_{(t+1)}=s',r_{(t+1)}=r|s_t, a_t, r_t, s_{(t-1)}, a_{(t-1)}, \ldots, r_1, s_0, a_0\}$$

is equal to $$Pr\{s_{t+1}=s',r_{t+1}=r|s_t, a_t\}$$

Which means that the probabilities of the next state $s_{t+1}$ and reward $r_{t+1}$ only depend on the current state $s_t$ and action $a_t$.

By representing states such that relevant information for making a decision is retained in the current state the garbage collection problem can be formulated as an MDP. Therefore, a prerequisite for being able to use reinforcement learning methods successfully is to select a good state representation. This step is described in further detail below.

In theory it is required that the agent (the reinforcement learning system—RLS) has complete knowledge about the state of the environment in order to guarantee that the learning algorithm asymptotically converges to the optimal solution. However, in practical applications fast learning is often more important than the guarantee of asymptotic optimal performance. In practice, many reinforcement learning schemes are still able to learn proper decision making in a reasonable amount of time even if the Markov property is violated.

The above described properties of reinforcement methods make them a suitable candidate for solving the concrete problem of garbage collection. The environment and various features of the garbage collection problem (e.g. the need for online-learning; lack of initial knowledge about the dynamics of the environment; delayed consequences of actions) make it a suitable candidate for the use of reinforcement learning methods.

Implementation Within an Application Server Environment

The following sections discuss reinforcement learning methods in detail, together with features and implementation details of such methods. The following sections also address the issue of which reinforcement method is most suitable for solving the problem of garbage collection in a computer system or virtual machine environment.

Figure 4:
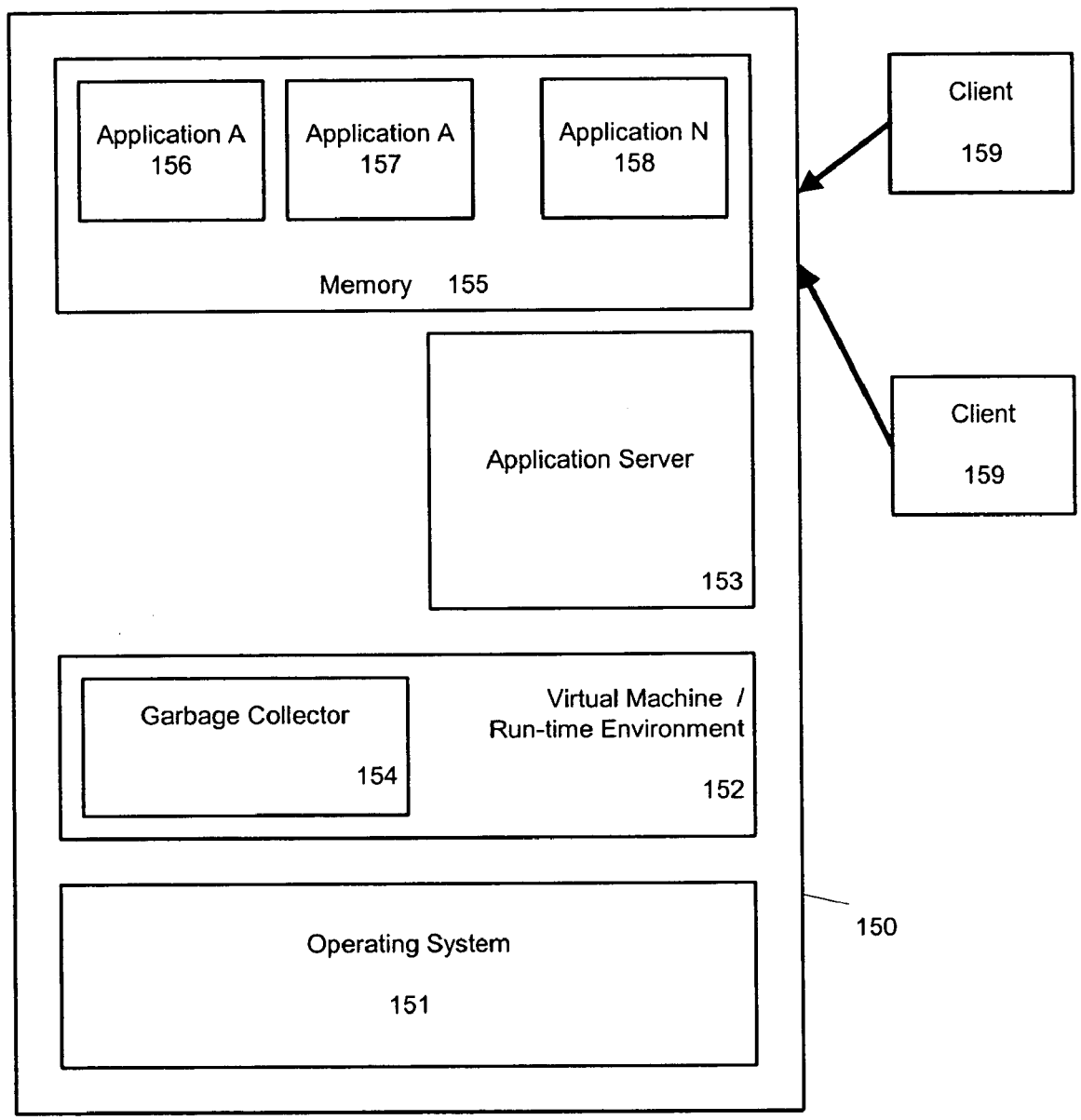
FIG. 4 shows a diagram of a system in accordance with an embodiment of the invention, and illustrates how an RLS garbage collector can be used in an application server environment or system to optimize the application server and the applications running thereon.

FIG. 4 illustrates how the invention can be used in an application server environment or system to optimize the performance of the application server and the applications running thereon. As shown in FIG. 4, the computer system 150 typically includes an operating system 151 upon which a virtual machine 152 (such as a JVM or run time environment) operates. The application server 153 sits upon this JVM run time environment 152. Applications 156, 157, 158 execute within the memory 155 of the system, where they may be accessed by clients. An RLS-based garbage collector 154 in accordance with an embodiment of the invention is used in conjunction with the virtual machine 152 to garbage collect the memory 155 in accordance with the reinforcement learning techniques described herein.

Several kinds of reinforcement learning methods may be used. The most common methods are Monte Carlo, temporal-difference, actor-critic and R-learning. Short descriptions of the above mentioned methods are presented below. Pros and cons for why a certain method is more or less suitable for use in garbage collection:

Monte Carlo methods, like all reinforcement learning methods, require no model of the environment, but have the disadvantage that the policy is not updated before the end of an episode. In the case of garbage collection an episode either corresponds to a complete execution of the running program or at least the period until the program runs out of memory. Waiting until the end of an episode before updating the policy makes Monte Carlo methods effectively impractical.

Temporal-difference methods update their policy immediately after a new state and reward are observed. This approach is the most suitable approach.

Actor-critic methods use separate memory structures for action selection and state evaluation. The memory usage is almost as crucial as the time performance for a JVM. Hence actor-critic methods are not of great interest in this environment.

R-learning is primarily a method for undiscounted, continuing tasks. An undiscounted task makes no difference between rewards accomplished earlier or later. This is not used since the concrete problem of garbage collection is a discounted task, i.e. rewards achieved later are less worth than earlier achieved rewards.

Derived from above presented information about different reinforcement learning methods, a temporal-difference method is best suited for address the garbage collection problem. There are mainly two different approaches when it comes to temporal-difference methods: Q-learning and SARSA.

Exploration vs. Exploitation

Systems solving reinforcement learning problems are confronted with a trade-off between exploration and exploitation. On the one hand they should maximize their reward by always choosing the action $a=\max_a Q(s, a)$ that has the highest Q-value in the current state s. However, there is also a need to explore alternative actions in order to learn more about the environment. Each time the agent (i.e. the reinforcement learning system) takes an action it faces two possible alternatives. One is to execute the action that according to the current beliefs has the highest Q-value. The other possibility is to explore a non-optimal action with a lower expected Q-value of higher uncertainty. Due to the probabilistic nature of the environment, an uncertain action of lower expected Q-value might ultimately turn out to be superior to the cur-rent best-known action. Obviously there is a risk that taking the sub-optimal action diminishes the overall reward. However, it still contributes to the knowledge about the environment, and therefore allows the learning program to take better actions with more certainty in the future.

It is said that a learning program needs to explore in the beginning and needs to rely on knowledge later on. Based on that assumption, a way of solving the "exploration versus exploitation"-problem is to use on-policy methods or off-policy methods. As explained above, a policy is representing the behavior of the system: the action selection and the update of Q-values.

The off-policy method follows one policy while updating another. The policy followed in the beginning takes a large number of explorative actions. The off-policy approach satisfies the exploration need as long as the exploring policy is followed. At the same time the experience of the exploration is used to update the non-exploring, non-followed policy. As time progresses, the need for exploration decreases while the need for exploiting increases and therefore the exploring policy is applied less and less frequently in favor of the non-exploring policy.

The on-policy methods, on the other hand, use the same policy for action selection and update. In other words, the on-policy approach evaluates and improves the very same policy that takes the decisions. This approach is used in systems that need to improve while running.

Regardless of what policy approach is being used (off-policy or on-policy), there are three different algorithms for choosing action:

The greedy algorithm chooses the action that is optimal according to the current state-action value function. Whatever action has the calculated, best state-action value in the present state is chosen. This algorithm emphasizes the need for exploitation.

The $\in$—greedy algorithm chooses the calculated, best action most of the times, but with small probability $\in$ a random action is selected instead. This algorithm satisfies both needs for exploration and exploitation.

The soft-max algorithm works similar to the $\in$—greedy algorithm but does not choose alternative actions completely at random but according to a weighted probability. The probability of an action is weighted with respect to the estimated Q-value of the current state and that action. The main difference between $\in$—greedy and the soft-max algorithm is that in the latter case, when a non-optimal action is chosen, it is more likely that the system chooses the next-best action rather than an arbitrary action. The highest probability is always given to the estimated current best action.

The greedy algorithm works best in deterministic environments, while the $\in$—greedy algorithm works best in stochastic environments. The soft-max algorithm is the most secure algorithm since it has a low probability of choosing inferior actions. The uncertainty about the application environment, the run-time context and the incomplete state information introduces a stochastic component into garbage collection problem. Hence, in accordance with one embodiment the $\in$—greedy algorithm is chosen.

Since the system should ideally improve while running and explore a lot in the beginning and less overtime, the on-policy method SARSA is preferred over the off-policy scheme of Q-learning.

Continuous States and Actions

Another common but not always occurring problem are environments that have continuous, and consequently infinitely many states. In these environments it is not possible to store state-action values in a simple look-up table. Such a representation is only feasible for a small number of discrete states and actions. Generalization of states, or rather function approximation of the Q-value function, provides a solution to this kind of problem.

Figure 5:
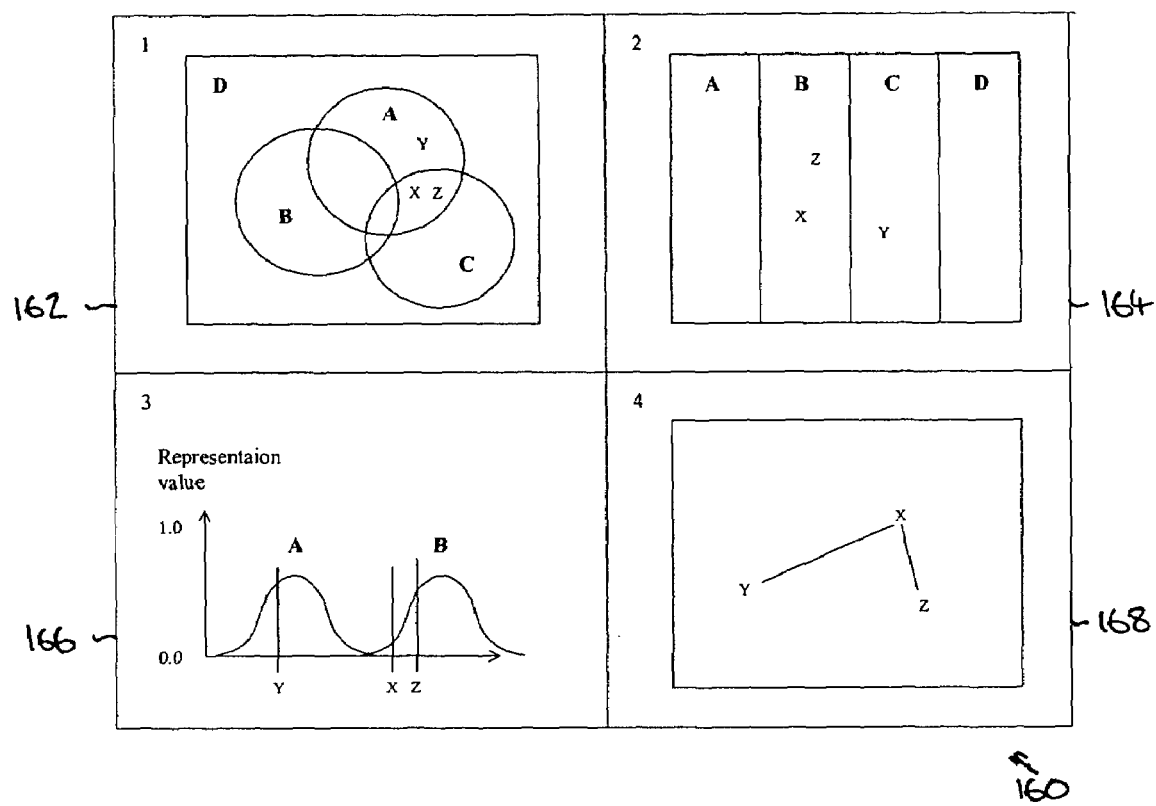
FIG. 5 shows an illustration of various methods of extracting generalized representation of states.

The two main variants of function approximation are: gradient-descent methods and linear methods. The linear methods are a special case of gradient-descent methods, where the approximated Q-value is a weighted linear sum of present state features values. Away to represent continuous states is the use of conjunctions of feature values. In this case the Q-function becomes linear in the binary feature vector and is parameterized by the weights associated to the individual feature. There are many approaches for extracting generalized representation of states. FIG. 5 shows an illustration of four such methods. Coarse coding 162 is illustrated to the upper left (1) and tile coding 164 to the upper right (2). To the lower left (3) a radial basis function 166 is presented and to the lower right (4) Kanerva coding 168 is illustrated:

Coarse coding 162 is a generalization method using a binary vector, where each index of the vector represents a feature of the state, either present (1) or absent (0). In FIG. 5, the circles are state features and state X has the features A and C present. Since state X has only one feature in common with Z, only partly generalization among them occurs. State X, on the other hand, is completely generalized from Z, since both features are present in both states.

Tile coding 164 is a form of coarse coding where the state feature areas are grouped together in partitions of the state space. These partitions are called tilings, and each element of a partition is called a tile. This approach approximates the state more accurately. The more tilings there are the more accurate approximation is achieved, but at the cost of higher complexity. In FIG. 5 a tiling is shown, divided into four tiles (the stripes). The state X generalizes from state Z, but not from state Y.

Radial basis functions 166 generalize continuous state features in a more accurate way than coarse coding. A feature is represented by a continuous value in the interval [0, 1] rather than a binary value. This value denotes the similarity between the state and the cluster represented by the radial basis function. In FIG. 5, state X resembles more to state Z than state Y as X and Z more belong to the radial basis function B than A.

Kanerva coding 168 is an alternative representation form of states if the state space has very high dimensionality. Kanerva coding uses an example based representation typical for nearest neighbor methods. A state is then genera-lized to one of these example states based on how close the state is to the example state. The distance may for instance be measured by counting the number of bits the two states have in common. In FIG. 5 the state X is generalized to the example state Z, since this is the closest example state.

In accordance with one embodiment the approaches that are easiest to implement are coarse coding and tile coding. In some instances, the radial basis functions may also be used.

The generalized state representation, the action value and an approximation parameter vector constitute the input-parameters of the function that calculates an approximated state-action value. A generalized state is represented by a vectors and an action a. These values are combined linearly by weighting them with the parameter vector θ:

$$Q(s, a,\theta)=\theta_1 s_1+ \ldots +\theta_m s_m+\theta_{(m+1)}a$$

Q(s, a, θ) is the approximated Q-value for being in state s, taking action a. Since the elements of s are equal to one or zero in tile coding, the Q-value approximations are just a summation of those weight parameters $\theta_i$ that correspond to present features ($s_i$=1).

According to the considerations in the above sections, in accordance with one embodiment the method used for solving the problem is on-policy SARSA with tile coding for generalization of continuous state feature values.

One motivation for using SARSA is the fact that it is an on-policy temporal-difference method. On-policy evaluation is desirable since the system for solving the concrete problem needs to improve while running. Tile coding is a commonly used approach for generalization of continuous values.

System Specifications

The following sections describe in further detail the design of the system for solving the concrete problem of garbage collection, followed by results of some system performance tests. The reinforcement learning scheme is implemented as a concrete algorithm, and the identification of state features, actions and rewards in accordance with an embodiment of the invention are presented.

There are some issues that must be addresses when defining the system specification. The initial question is how to formulate the concrete problem of garbage collection as a reinforcement problem. This is possible if the states are represented in a way that they contain relevant information about the environment. Factors which must be addressed include:

How the states are represented such that they provide all relevant information about the environment.

Which actions are available to the agent to interact with the environment.

What rewards are given and how can they be quantified in order to achieve the desired behavior of the garbage collector.

These factors are discussed in the following sections.

Figure 6:
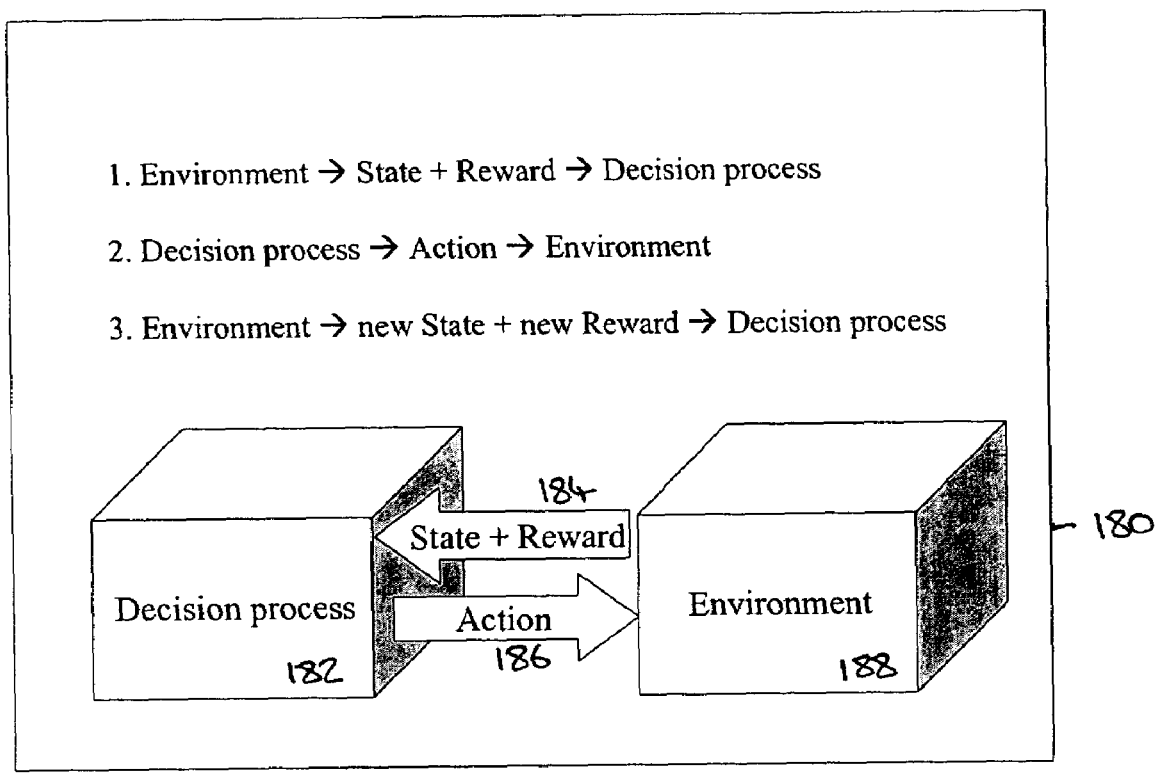
FIG. 6 shows an illustration of a model of a reinforcement learning system.

FIG. 6 shows an illustration of a general model of a reinforcement learning system. First the decision process 182 observes the current state and reward 184. Then the decision process performs an action 186 that effects the environment 188. Finally the environment returns a reward and the new state. The reinforcement learning algorithm obtains the information about the current state and the reward from the environment. The reinforcement learning algorithm decides what action to take next and updates its prior belief about the world based on the observed reward and the new state. The process either terminates when a final goal state is reached, (or in the case of an infinite horizon problem continues forever).

State Features

The choice of state features and penalty/reward function play a crucial role for the ultimate behavior of the reinforcement system. The system can only optimize its behavior according to the objectives specified through the reward function.

In accordance with one embodiment a fragmentation factor is used to keep track of how much of the heap is fragmented. If the heap is very fragmented garbage collection should be performed more frequently. This is desired in order to collect dead nearby objects of "fragmentations" as fast as possible. By doing this larger blocks of free memory may appear that can be reused. Garbage collection should be performed when a lot of non-useful, small blocks of free memory (fragments) occur.

It is important to keep track of how much memory is available in the heap. Based on this information the reinforcement learning system is able to learn at which "allocated memory"-percentage it is most rewarding to perform a certain action, for instance the action of garbage collecting.

In accordance with one embodiment, the speed at which the running program allocates memory is measured. This makes it possible to keep track of when, at the latest, the garbage collector must start garbage collecting for a certain application running. During closer consideration this measurement corresponds to keeping track of the amount of available memory the last time a decision was made.

In accordance with another embodiment the time that is really spent on executing instructions of the running program is measured. This allows some evaluation of what extra features that may be added to the default garbage collector can be made. For instance, the longer an application runs the more fragmentation will occur. If fragmentation becomes a problem, compacting becomes useful. If the application runs for a long time, the choices regarding compaction or not are useful additions.

In other embodiments the average size of new allocated objects can provide valuable information about the application running that might affect the performance of the garbage collector. Other features include average age of new allocated objects, and number of new allocated objects.

State Representation

Each possible measurable value as described above constitutes a possible feature of a state. Since the values are continuous they need to be translated into discrete values. In accordance with one embodiment Tilings are used for achieving the translation. One tiling can for example represent a feature combination or feature-action combination. Each tiling is divided into tiles, where each tile corresponds to an interval of one continuous feature or combinations of feature intervals.

One approach for representing a state in the general case is to let an array of all tiles constitute the state of the system. Each tile may have the value 1 (the continuous value of the state feature lies within this interval (tile) of the feature tiling) or 0 (it lies not within this interval):

Current state feature value lies within the corresponding tile→1

Current state feature value lies not within the corresponding tile→0

So for example a state can be represented as s=[1, 1, 0, ..., 1, 0, 1], where each index of the vector corresponds to one single tile.

Rewards

To evaluate the current situation or status within the system, measurable values of the goals of the garbage collector are desired. The goals of the garbage collector include maximization of the end-to-end performance and minimization of the long pause times caused by garbage collection. The goal values constitute a basis for rewards and penalties. The reward is always represented as a real-value. The reward function should accordingly consist of a function assigning real-valued rewards to different situations.

A problem when deciding the reward function is to decide what is good and what is bad. There are a lot of states that are neither bad nor good themselves, but might lead to bad situations. This is only one aspect of the complexity of the environment. Another is that good states hardly exist, while garbage collection always intrudes on the process time of the running program and always constitutes extra costs. This indicates that the reward should only consist of penalties when things go wrong. In accordance with an embodiment of the invention, the situations in which a penalty should possibly be imposed are presented below.

A severe penalty is imposed if the program running runs out of memory, since this is the worst situation that might occur.

To impose a higher penalty in proportion to the higher quantity of occupied memory would maybe at first sight seem like a good idea, but it is not. Even if the memory is occupied up to 99% it is not a problem, since the running program might complete within the given memory. This is the most desirable case, i.e. to have the program finishing with no garbage collection required. The conclusion is that imposing high penalties for high occupation of memory would not be a good idea.

Figure 7:
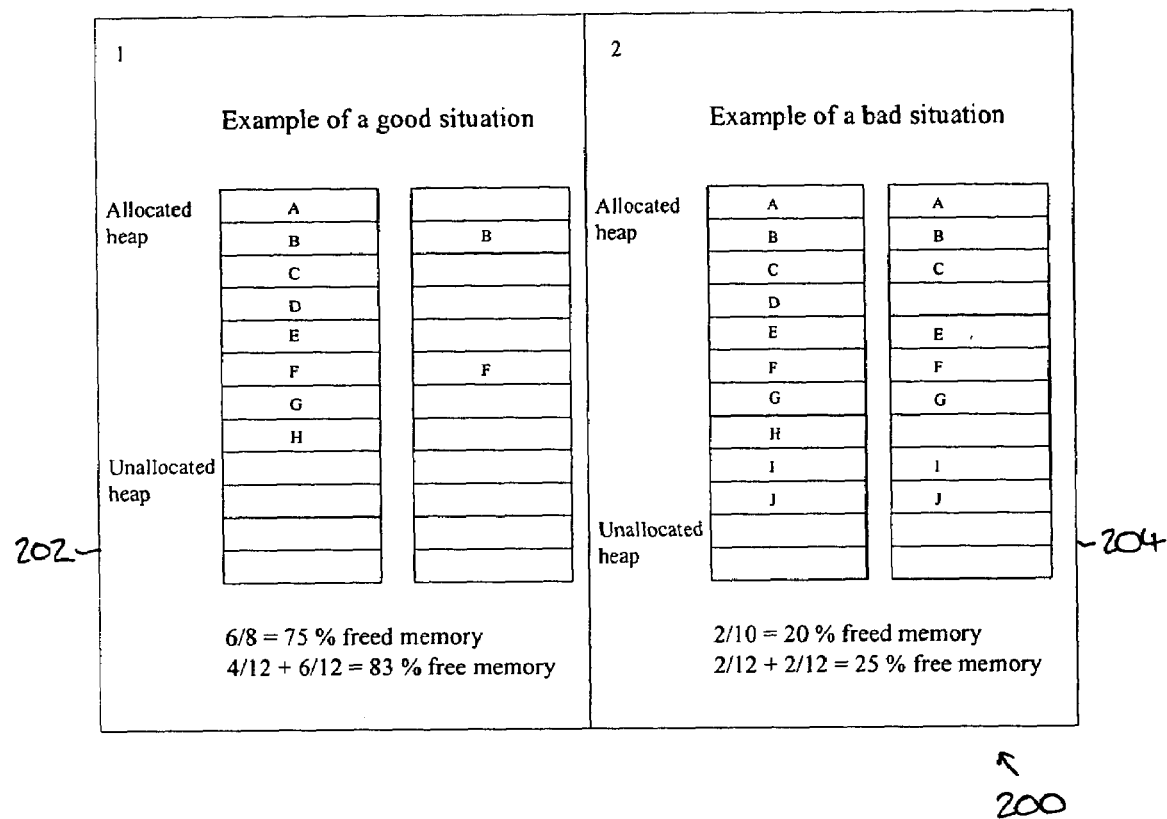
FIG. 7 shows an illustration of a memory showing a good situation with a high freeing rate and much memory left in the unallocated part of the heap is illustrated to the left (1). A worse situation is illustrated to the right (2).

The freed memory after completed garbage collection can be compared to the occupied memory of the heap before that garbage collection. This measurement gives an estimate of how large percentage of the memory of the allocated heap that has been freed. This freeing rate together with the size of the still unallocated heap would be of interest. If the percentage is high there is nothing to worry about. FIG. 7 shows an illustration of a memory 200 including a good situation with a high freeing rate and much memory left in the unallocated part of the heap 202. A worse situation is illustrated to the right 204, where there is little memory left in the unallocated heap and the garbage collection has a low freeing rate. This last situation may cause problems. If the percentage is low and the size of the free memory in the heap is low as well, then problems may occur and penalty may be imposed. The latter situation might occur if a running program has a lot of long-living objects and runs for a long time, so that most of the heap will be occupied.

In conventional systems the heap is not garbage collected until the heap is full, but with the reinforcement learning system connected it can be adapted to collect earlier.

Figure 8:
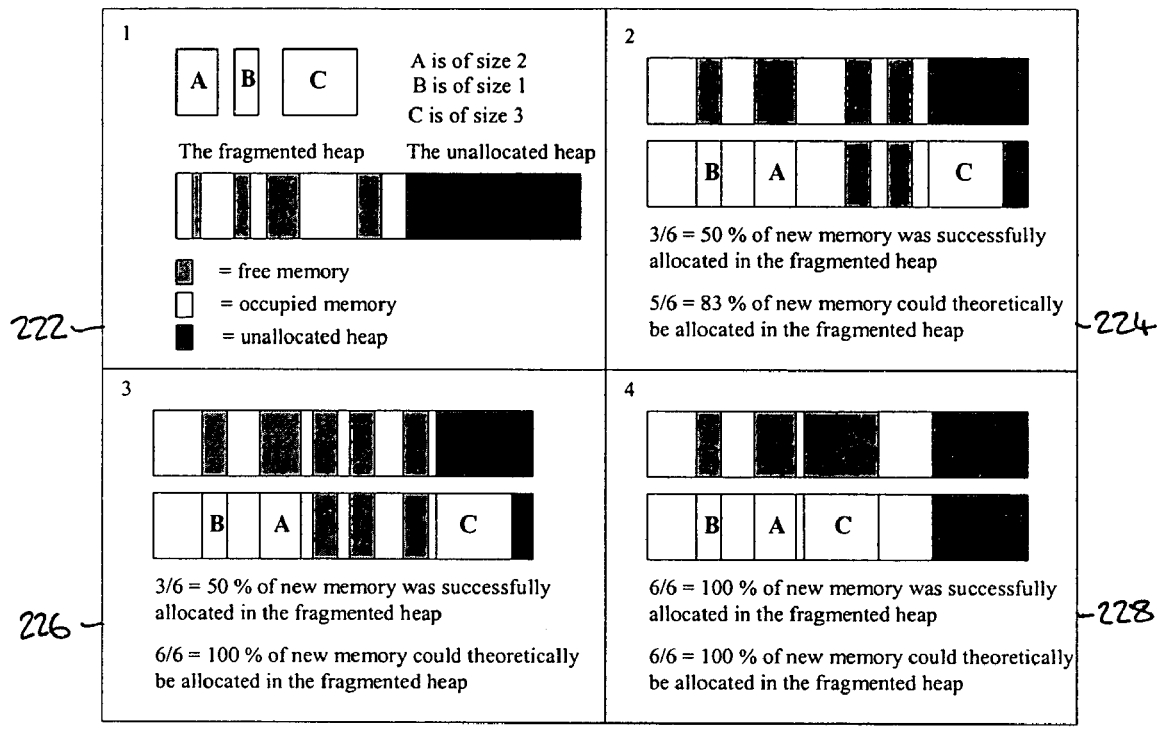
FIG. 8 shows an illustration of various memory allocation situations.

In accordance with one embodiment the success rate of allocated memory in the fragmented area of the heap may be observed. The fragmented area of the heap means the area of the heap that is most fragmented. The amount of new memory allocated in the fragmented area of the heap can be compared to the amount of the new memory that theoretically could be allocated in the fragmented area of the heap. FIG. 8 shows an illustration of various memory allocation situations 220. To the upper right 224 half of the new allocated memory was successfully allocated in the fragmented heap. To the lower left 226 the same percent was successfully allocated in the fragmented heap although space for all new allocated objects exists in the fragmented area. To the lower right 228 all new allocated objects could be successfully allocated in the fragmented heap. It is desirable that 100% of the new allocated memory is allocated in the fragmented area of the heap, to decrease fragmentation. A proportional penalty can be imposed for a bad percentage.

To be forced to take a heap lock, i.e. to lock the free memory of the heap so that no changes can be made to it, should be punished.

The longer a compacting garbage collector iterates over the free-list the higher penalty should be distributed. The longer the system needs to iterate, the more fragmentation exists in the heap. Much fragmentation is not necessarily bad, but the iteration steals time from the program running, which should be punished.

When it comes to compacting garbage collectors a measurement of the effectiveness of a compaction can be a base for assigning a reward or a penalty. If there was no need for compacting, the section in question must have been non-fragmented. Accordingly a situation like this should be assigned a reward.

A fundamental rule for imposing penalty should be to punish all activities that steal time from the running program. For instance a punishment might be imposed every time the system performs a garbage collection. An alternative can be to impose a penalty proportional to how much time of the total run time of the program that is spent on garbage collection.

Another penalty situation is when the average time of the breaks approaches the maximum allowed break time. It is also important to ensure that the number of breaks does not exceed a maximum allowed number of breaks. If the average break time is high and the number of breaks is low, the situation may be balanced through actions taken. If they both are high, not only a more drastic action has to be taken, but also a penalty might be in order.

Another view of the break issue is to impose a higher penalty the longer a break of the running program is. This coincides with the previous consideration that every interruption of the running program be punished.

A penalty may also be imposed for not achieving good behavior. For example, when it is not possible to allocate new objects because of a too fragmented heap, a penalty may be given.

A good situation to which a reward, not a penalty, should be assigned may include that in which a compacting collector frees large, connected chunks with memory, a reward would be appropriate. The opposite, if the garbage collector frees a small amount of memory and the running program is still allocating objects can possibly be punished in a linear way, as some of the other reward situations described above.

Action Features

Whether to garbage collect or not is an important issue. This is the decision that is made by the system in accordance with embodiments of the invention. Other actions that can be taken include the following.

When the memory is not large enough and the garbage collection did not successfully to free a satisfactorily large amount of memory, the heap can be extended. The decision of extending the heap or not (or in the future, if a functionality of decreasing the heap size is implemented, to decrease it or not) is one possible decision or action to take. A subsequent decision would be to which extent the heap should be increased or decreased.

To save heap space, or rather to use it more effectively, a decision can be made of compacting the heap or not. And if the heap is compacted, how large of area of the heap should then be compacted. Another subsequent decision may be what section of the heap to compact.

To handle synchronization between allocating threads of the running program, the heap is divided into Thread Local Areas (TLA). Each allocating thread is allowed to allocate memory within only one TLA at a time and there is only one thread permitted to allocate in a certain TLA. A decision can be made as to the size of each TLA.

When allocating large objects a Large Object Space (LOS) can be used, especially in generational garbage collectors, to prevent large objects to be moved. A decision can be made as to the size of the LOS and how large an object has to be, to be treated as a large object.

Memory Block Size (MBS) is the minimum size of a free memory block for being added to the free list. Different applications may cause different needs when it comes to this size value.

In accordance with some embodiments the MBS and the TLA metrics are dependent of each other. In other embodiments it may be preferable to choose different sizes for them.

Depending on the particular embodiment either one or several generations of garbage collecting may be used. It may be possible, to change from two generations into one, but not the other way around. In some embodiments the system can vary the size of the different generations. If there is a promotion rate available, this is a factor that the system can vary.

Another factor to consider is if the garbage collector should use an incremental approach and, in that case, decide the size of the heap area that should be collected at a time. The same goes for using the concurrent approach or not, together with the factors of how many garbage collection steps at a time and how long time the system should pre-clean.

When parallel garbage collection is implemented the system can choose between parallel garbage collection or not. Typically there are only advantages with using parallel collectors where several processors are available.

Action Representation

Actions may be represented as positive, discrete values: 1, 2, ..., N; where N is the total number of actions. Each representation value corresponds to a specific action. The representations in the binary choice cases suggested above look like:

Perform→1
Do not perform→0

Comparative Measurements between the RLS and Conventional Garbage Collection Techniques When evaluating the performance of the system there are two values of interest for comparison with the existing garbage collecting system. One is the measurement of the performance of the current garbage collector compared to the garbage collector integrated with the reinforcement learning system. The performance may either be measured based on the accumulated reward overtime, since the reward function should reflect achieved good behavior, or by measuring time for completing certain tasks. The time measurements reflect how many times each system has performed a garbage collection, which is the most interesting factor to measure.

On the other hand, it must not take too long for the system to learn. This metric must also be taken under consideration when evaluating the comparison between a conventional JVM (for example JRockit), and a JVM or other type of system that incorporates a reinforcement learning system in accordance with the present invention. Performance may be measured through observation of the average reward obtained, and also according to the goals of the garbage collector (i.e. the features underlying the reward system).

In accordance with one embodiment the system is designed to make only one decision, namely the decision of when to garbage collect. In the results presented below the comparison with a "mostly-concurrent" garbage collector is performed in similar environments. Only one application running at a time is considered. The state features constituting a state representation are those concerned with the concrete problem of garbage collection. The embodiment discussed below uses tile coding only, although other approaches can be used.

In accordance with one embodiment, necessary measurements for creating a state for the solution system include:

The amount of allocated memory per time unit
The amount of allocated memory the last time a decision was made
How much of the heap is fragmented
Application-specific state features can also be added including:
Average size of new allocated objects
Average age of allocated objects
Average amount of new allocated objects It is also important to observe events underlying the rewards and penalties. These are not state features, but are of interest for deciding rewards and penalties. The features underlying the reward system are:

A variable representing if a garbage collection was made during the last time step
A variable representing if the system ran out of memory during the last time step
The amount of occupied memory before the garbage collection
The amount of occupied memory left after completed garbage collection
The break length of phase one of a "mostly-concurrent" garbage collector
The break length of phase four of a "mostly-concurrent" garbage collector
The number of situations where a heap lock needed to be taken The action to take consists of one choice only: the choice of performing a garbage collection or not at a certain time step. The action representation is in this case binary (1=perform, 0=do not perform). This means that the action value does not need to be re-calculated in any way.

Adapting the SARSA Algorithm

If s and a are the vectors representing states and actions, then the estimated state-action value of that state and action is Q(s, a). The linear gradient-descent approximation of the action-value function Q(s, a) will then be Q(s, a, θ), where θ is a vector containing the weight coefficients ($\theta_1 - \theta_{(m+n)}$ below).

For a fixed θ, the approximated Q-function value only depends on s and a:

$$Q(s,a) = \theta_1 s_1 + \ldots + \theta_m s_m + \theta_{(m+1)} a_1 + \ldots + \theta_{(m+n)} a_n$$

If s is a vector of size m and a is a vector of size n, then θ must be a vector of size m+n. Remember that each index of s corresponds to either a single state feature inter-val, a combined interval of two or more state features or combinations of actions and state feature intervals, while the indexes of a corresponds to different actions.

The gradient of the function approximation Q(s, a, θ) is needed for using gradient-descent function approximation. The gradient of Q(s, a, θ) with regard to $\theta_i$ is:

$$\nabla_\theta(s,a,\theta) : [dQ(s,a,\theta)/d\theta_i, dQ(s,a,\theta)/d\theta_j]$$

where in the linear case:

$$dQ(s,a,\theta)/d\theta_i = s_i, \text{ for } 0 \leq i < n$$

$$dQ(s,a,\theta)/d\theta_i = a_{i-n}, \text{ for } n \leq i < n+m$$

FIG. 9 shows a code listing 240 in accordance with an embodiment of the invention, showing pseudo code modified to suit the concrete problem of garbage collection. The pseudo code concerns SARSA with linear, gradient-descent function approximation using a soft-max policy.

Problems may occur applying the linear approximation. This is a common problem in neural networks systems: the Exclusive-Or (XOR) problem. The XOR problem concerns how a learning system may arrive at identical output when the input data has nothing in common and is based on XOR reasoning.

Another problem that may occur is that the exploring decreases too fast. This problem is solved through changing the random action choice function to a non-linear function:

$$\text{Probability to choose a random action } P = P_0 * e^{-(Timestep2/C)}$$

Where C is between 2000–5000 and $P_0 = 0.5$. C corresponds to the square number of steps at which the original probability $P_0$ of chosen a random action decreased by a factor $e^{-1}$.

A third problem that may occur is that the JVM may be optimized in a way that makes it difficult to measure the fragmentation percentage without redesigning the garbage collector. If fragmentation is measured in the traditional system it would result in a very high uncertainty of the measured value. To address this and to be able to achieve reliable results no consideration may be taken as to the fragmentation percentage. The assumption is that the amount of available memory is of more importance to the decision of when to garbage collect than the fragmentation percentage and accordingly will give enough information about a situation for being able to achieve a satisfying behavior.

In accordance with once embodiment the state features $s_1$ and $s_2$ used in the prototype are the current amount of available memory, and the amount of memory available at the previous time step.

There is only one binary decision to make, namely whether to garbage collect or not. Hence, the action set contains only two actions {0, 1}, where 1 represents performing a garbage collection and 0 represents not performing a garbage collection.

The reward function of the prototype imposes a penalty (−10) for performing a garbage collection. The penalty for running out of memory is set to −500. It will be evident that these figures may be adjusted depending on the particular implementation. It is difficult to specify the quantitative trade-off between using time for garbage collection and running out of memory. In principle the later situation should be avoided at all costs, but a too large penalty in that case might bias the decision process towards too frequent garbage collection. Running out of memory is not desirable since a concurrent garbage collector is used. A concurrent garbage collector must stop all threads if the system runs out of memory and that is to prevent the purpose of using a concurrent garbage collector.

The random probability function that determines whether to pick the action with the highest Q-value or a random action for exploration is implemented according to the formula stated before values given one for a particular embodiment. Other values may be used within the spirit and scope of the invention):

$$\text{Probability to choose a random action} = 0.5 * e^{-(TimeStep/C)}$$

Where in one embodiment C is set to 5000, which means that random actions are taken until 25000 time steps elapsed. A time step corresponds to a time point where the RLS makes a decision. Between each time step a time interval of about 50 ms elapses, after which RLS makes a new decision.

The learning rate a is set to decrease over time. The function that determines the learning rate is implemented according to the formula stated below:

$$\text{Learning rate} = 0.1 * e^{-(TimeStep/D)}$$

Where D is set to 20000. The discount factor gamma is set to 0.9.

The tile coding representation of the state in the prototype is chosen to be one 10×10×2-tiling for the two possible actions combined with each combination of both state features in the case where both state features were used, and one 10×2-tiling in the case of when only si was used.

A non-uniform tiling was chosen, in which the tile resolution is increased for states of low available memory, and a coarser resolution for states in which memory occupancy is still low. The tiles for feature $s_1$ correspond to the intervals [0,4], [4,8], [8,10], [10,12], [12,14], [14,16], [16,18], [18, 20], [22,26] and [30, 100]. The tiles for feature $s_2$ are the same as for feature $s_1$.

The test applications used for evaluation are designed to behave in three different ways. All test applications alternate between two different memory allocation behaviors, one with a high allocation rate and one with a low allocation rate. Each behavior lasts for a certain time interval, which duration is measured in terms of the number of iterations. The first test application has intervals that are 10000 iterations long. The second test application has intervals that consist of 20000 iterations. The third test application alternates randomly between intervals consisting of 10000 iterations and 20000 iterations as well as between the two different allocation behaviors.

Comparative Results

The system can also be used in the identification of suitable state features, underlying reward features and action features for use in dynamic garbage collection learning.

This section compares the performance of a conventional JVM and a JVM using reinforcement learning for making the decision of when to garbage collect. As further described herein, the JVM using reinforcement learning is referred to as the RLS (the Reinforcement Learning System) and the conventional JVM as JRockit.

Since JRockit is optimized for environments in which the allocation behavior changes slowly, environments where the allocation behavior changes more rapidly might cause a degraded performance of JRockit. In these types of environments an RLS, as used in embodiments of the invention, may be particularly useful. As described herein, both systems are tested and compared only with respect to applications that exhibit different memory allocation rates.

FIG. 10 shows performance graphs 260 of an RLS-based system in accordance with an embodiment of the invention compared to a regular JVM for short intervals. To the left 262, 266 the interval performance of the RLS is compared to the interval performance of JRockit when running the application with short intervals. To the right 264, 268 the accumulated time performance is illustrated. The upper charts 262, 264 show the performances during the first 20 intervals and the lower charts 266, 268 show the performances during 20 intervals after ca 50000 time steps. In the beginning the RLS performs a lot worse than the converted JVM (JRockit) due to the random choices of actions and the fact that the RLS is still learning about the environment. After about 50000 time steps the performance of the RLS compared to JRockit is about the same. This shows the tendency of a decreasing need of time, i.e. decreasing frequency of garbage collections, for the RLS system as it learns.

Figure 11:
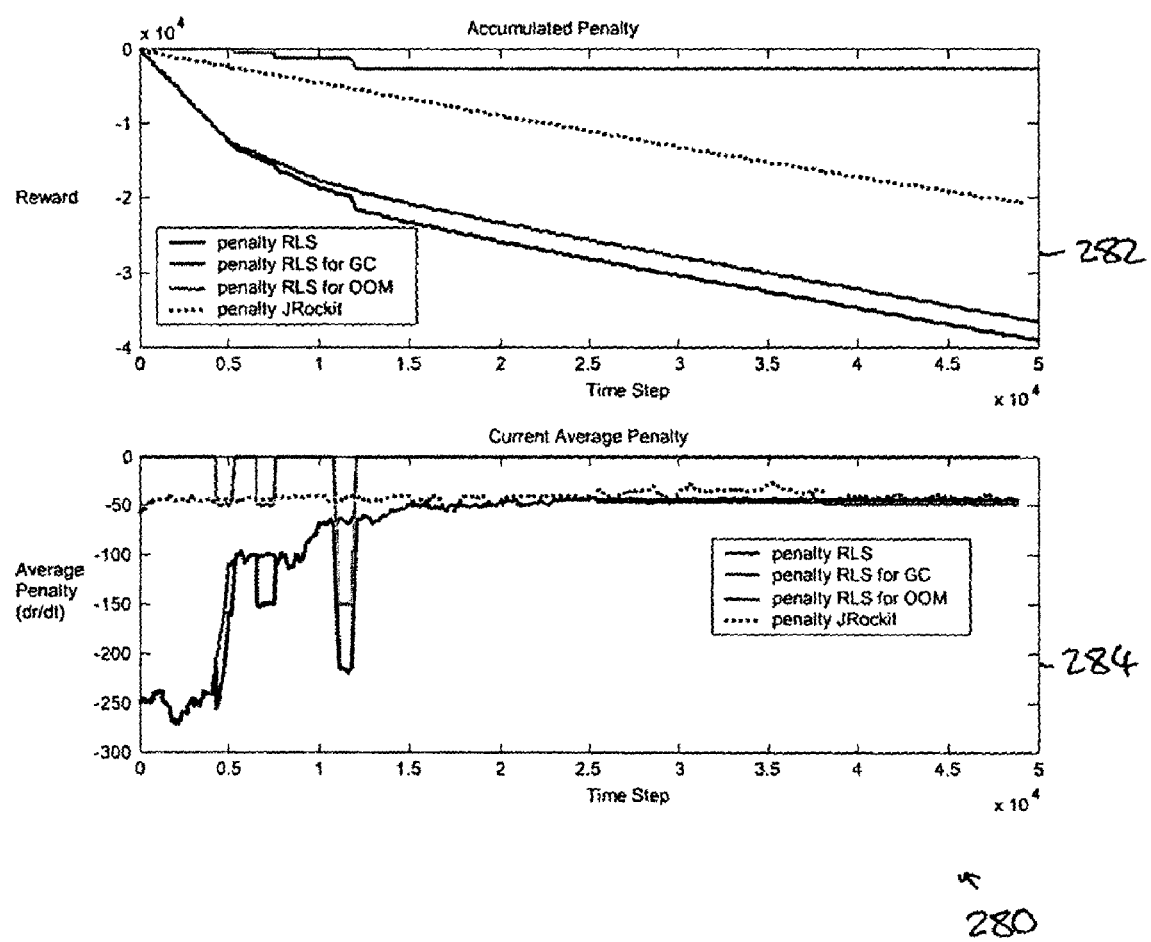
FIG. 11 shows penalty graphs of an RLS system compared to a regular JVM.

FIG. 11 shows penalty graphs 280 of an RLS system compared to a regular JVM. The upper chart 282 shows the accumulated penalty for the RLS compared to the accumulated reward for JRockit when running the application with short intervals. The lower chart 284 shows the average penalty as a function of time. The accumulated penalty for running out of memory becomes constant over time, which demonstrates that the RLS actually learns to avoid running out of memory. After 13000 time steps all future penalties imposed on the RLS are due to garbage collection only. After about 20000 time steps the rate at which JRockit and the RLS are penalized for invoking garbage collections becomes similar.

Figure 12:
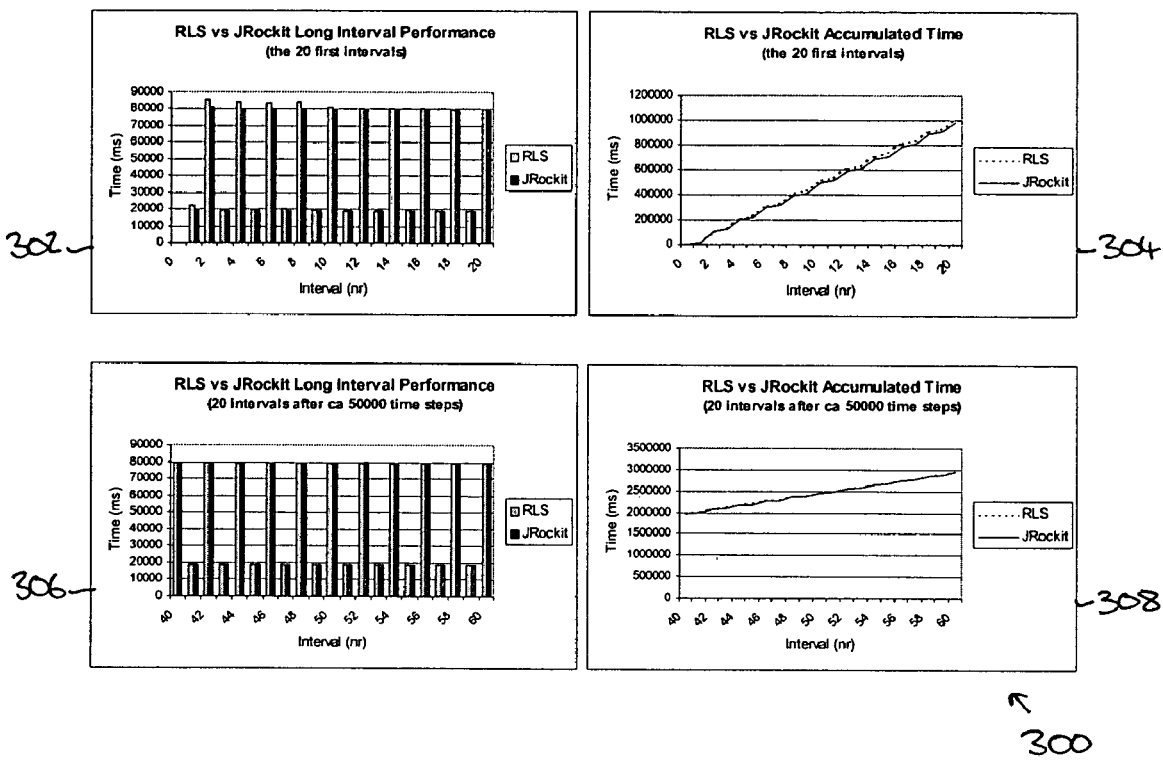
FIG. 12 shows performance graphs of an RLS-based system in accordance with an embodiment of the invention compared to a regular JVM, for long intervals.

FIG. 12 shows performance graphs 300 of an RLS-based system in accordance with an embodiment of the invention compared to a regular JVM, for long intervals. To the left 302, 306 the interval performance of the RLS is compared to the interval performance of JRockit when running the application with long intervals. To the right 304, 308 the accumulated time performance is illustrated. The upper charts 302, 304 show the performances during the first 20 intervals and the lower charts 306, 308 show the performances during 20 intervals after ca 50000 time steps. As may be seen, the RLS performs slightly worse in the beginning than in the short interval application case. This application environment seems to be more difficult for the RLS to learn, due to the fact that it runs out of memory more times than in the previous case during the learning phase (nine times instead of five times).

Figure 13:
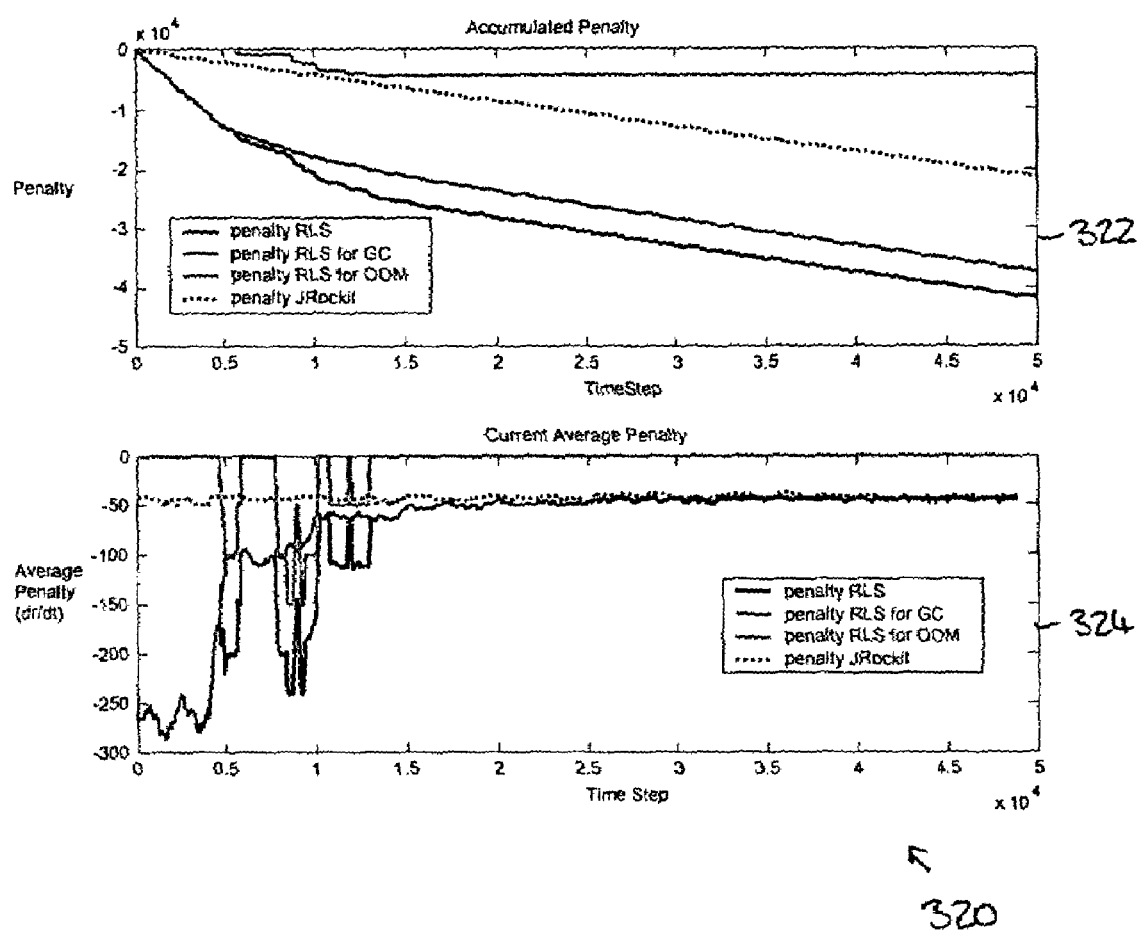
FIG. 13 shows penalty graphs of an RLS system compared to a regular JVM.

FIG. 13 shows penalty graphs 320 of an RLS system compared to a regular JVM. The upper chart 322 shows the accumulated penalty for the RLS compared to the accumulated reward for JRockit when running the application with long intervals. The lower chart 324 shows the average penalty as a function of time. The results are almost the same as for the application with the short intervals, as mentioned above. The accumulated penalty for running out of memory becomes constant overtime in this case too and the accumulated penalty for invoking garbage collections develops in the same way as in the previous case.

Figure 14:
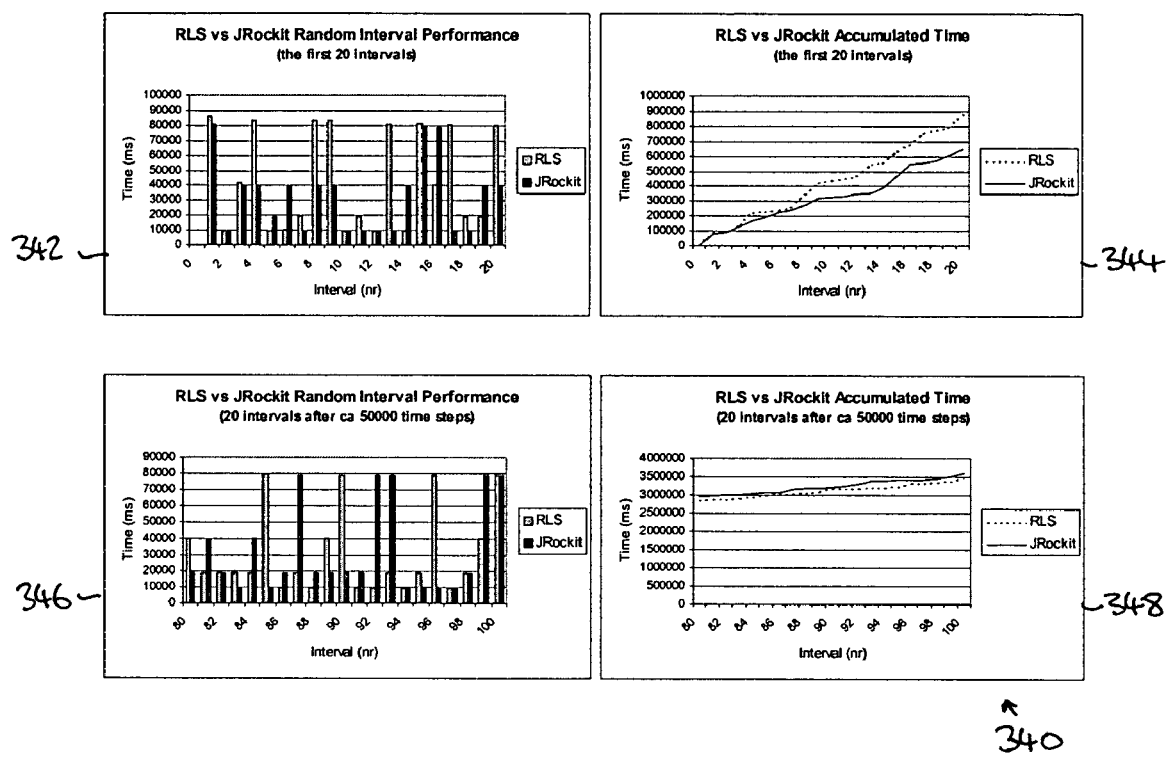
FIG. 14 shows performance graphs of an RLS-based system in accordance with an embodiment of the invention compared to a regular JVM, for random intervals.

FIG. 14 shows performance graphs 340 of an RLS-based system in accordance with an embodiment of the invention compared to a regular JVM, for random intervals. To the left 342, 346 the interval performance of the RLS is compared to the interval performance of JRockit when running the application with randomly appearing intervals. To the right 344, 348 the accumulated time performance is illustrated. The upper charts 342, 344 show the performances during the first 20 intervals and the lower charts 346, 348 show the performances during 20 intervals after ca 50000 time steps. Due to the random distribution of intervals an interval-to-interval performance comparison of these two different runs is not meaningful. Instead, the accumulated time performances illustrated to the right in FIG. 14 are used for comparison. As can be seen in the lower chart to the right the RLS performs slightly better than JRockit in this dynamic environment. This confirms that the RLS is able to outperform an ordinary JVM in a dynamic environment.

Figure 15:
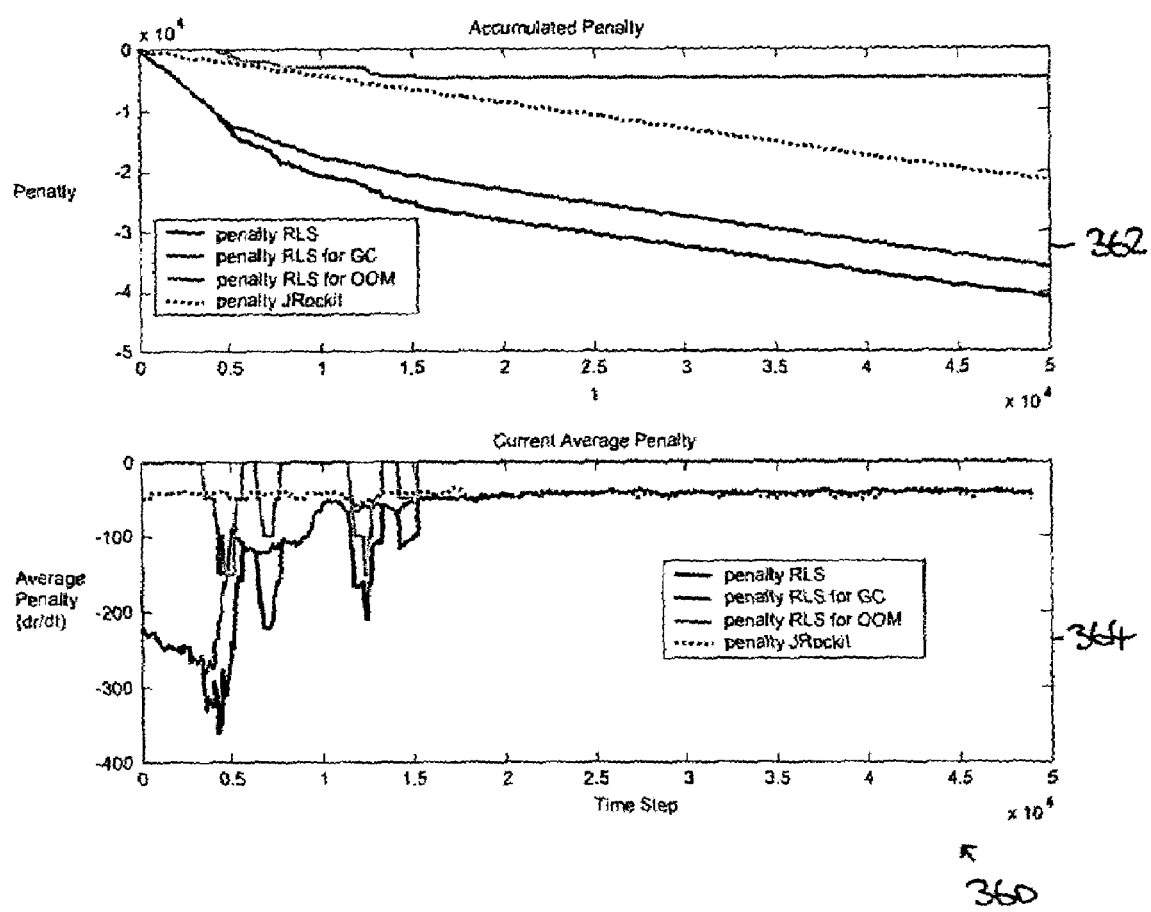
FIG. 15 shows penalty graphs of an RLS system compared to a regular JVM.

FIG. 15 shows penalty graphs 340 of an RLS system compared to a regular JVM. The upper chart 362 illustrates the accumulated penalty for the RLS compared to JRockit during a test session with the application with randomly appearing intervals. The lower chart 364 illustrates the average penalty as a function of time. The results show that the RLS runs out of memory a few times more than in the other cases, but learns to avoid it over time, even in this more dynamic case.

In Table 1 the accumulated penalty during a time period where the RLS has completed its learning is shown. As may be seen, the results of the RLS are comparable to the results of JRockit. In the case of the test application with random appearing intervals the value in the table verifies the results presented above: that the RLS performs better than JRockit in the environment that was constructed to be more dynamic. The table illustrates the accumulated penalty from time step 30000 to time step 50000. This corresponds to the performance of the RLS after completed learning.

TABLE 1

| Test application type | Accumulated penalty for the RLS | Accumulated penalty for JRockit |
|---|---|---|
| Short intervals | −8640 | −7910 |
| Long intervals | −8970 | −8520 |
| Random intervals | −8400 | −8550 |

Figure 16:
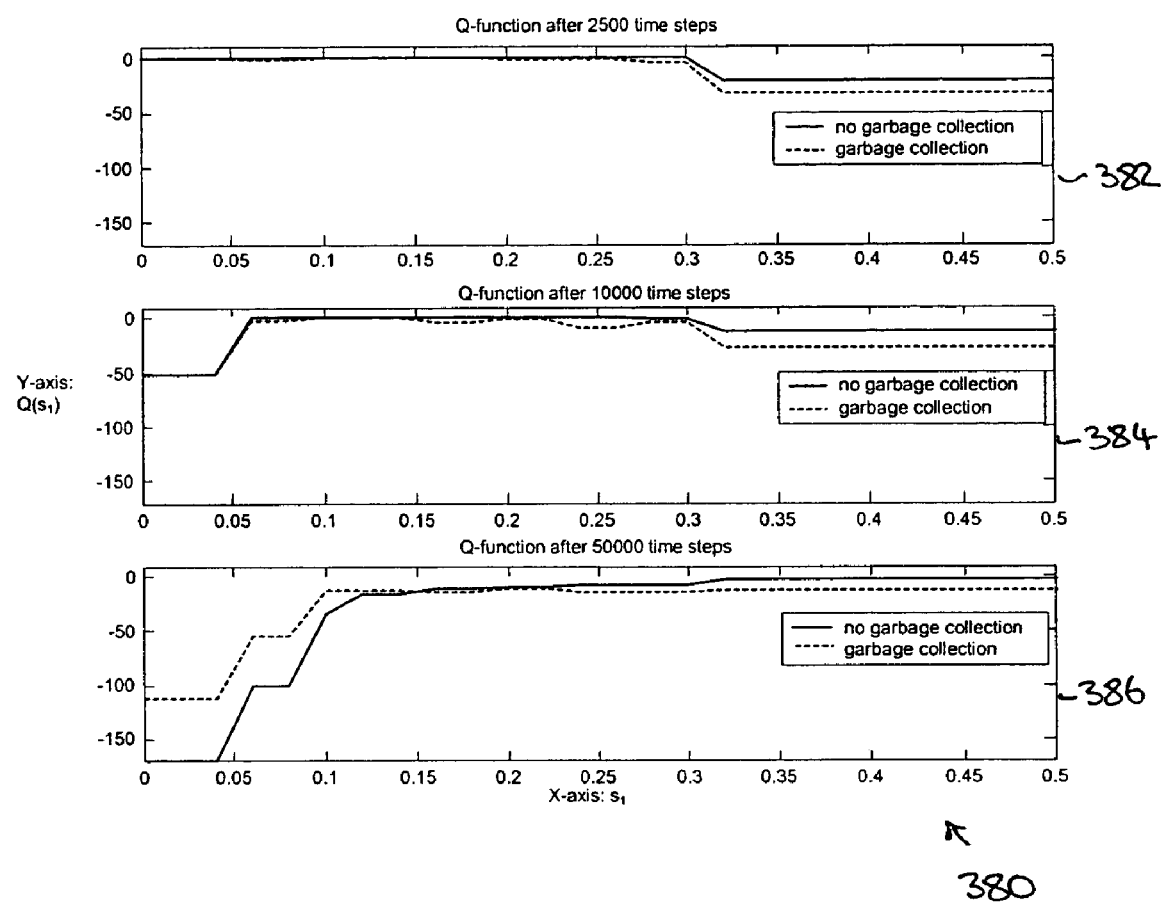
FIG. 16 shows a graph of Q-function overtime in accordance with an embodiment of the invention.

FIG. 16 shows a graph 380 of Q-function overtime in accordance with an embodiment of the invention. The figure shows the development of the state-action value function, the Q-function, overtime. The upper chart 382 shows the Q-function after ca 2500 time steps. The middle chart 384 shows the Q-function after ca 10000 time steps and the lower chart 386 shows the Q-function after ca 50000 time steps and is then constant. Initially, the probability of choosing a random action is still very high and the frequency of choosing the action to garbage collect is high enough to prevent the system from running out of memory. On the other hand the high frequency of random actions during the first 5000 time steps does not require the system to pick a garbage collection action, which means that it will always favor not to garbage collect in order to avoid the penalty. Running out of memory never occurs due to the high value of $p_0$ (0.5) in the probability function for choosing a random action. This can easily be adjusted by choosing a lower value of $p_0$. The only thing the system has learned so far is that it is better to not garbage collect than to garbage collect with a Q-value difference of −10, which is the penalty of invoking a garbage collection.

The middle chart 384 in FIG. 16 shows the Q-function after ca 10000 time steps. The probability of choosing a random action has now decreased. The frequency of invoking a garbage collection has led to a situation where the system actually runs out of memory and RLS incurs a large penalty, and thereby improves its knowledge about when it is preferable to garbage collect.

The lower chart 386 in FIG. 16 illustrates the Q-function after ca 50000 time steps. At this point of time the Q-values for the different states converged and RLS follows a policy that is optimal with respect to the particular test application and the reward function.

The overall behavior of the RLS is quite similar for the three test cases presented above. However, there is a slight difference regarding the number of times the system runs out of memory during learning. In testing, during the first test application, the system runs out of memory five times, while during the second and third test application the system runs out of memory nine and ten times respectively. This indicates that the later two scenarios are a bit more difficult to learn due to the dynamic memory allocation rate.

The RLS may take additional state features into consideration, in order to achieve even better performance.

Figure 17:
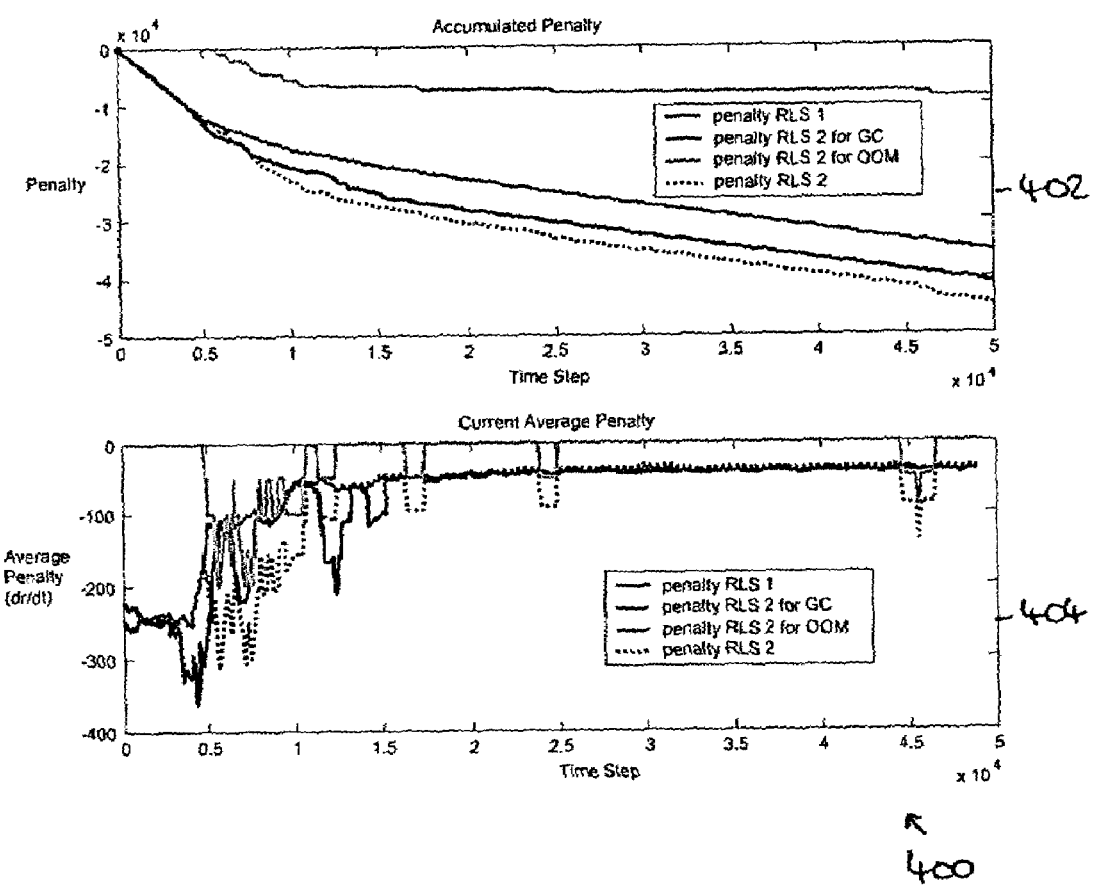
FIG. 17 shows a graph of accumulated penalty for two states in accordance with an embodiment of the invention.

In some instances, the results from using both the state features $s_1$ and $s_2$ (the current amount of available memory and the previous amount of available memory) may be worse than in the case of only one state feature. One reason for the inferior behavior is that the new feature increases the number of states and that therefore converging to the correct Q-values requires more time. Another reason is that the state feature $s_2$ does not contain the right information as a lot of states that are never visited, e.g. $s_1$=10% and $s_2$=70%. Methods to address this include using the change in available memory $s_1$-$s_2$ as an additional feature at a resolution: [0–2], [3–4], [5–6], [7–8], [9–10]. In any case the probability for choosing a random action and the learning rate can be adjusted such that all states at which the system potentially could run out of memory are visited frequently enough. FIG. 17 shows a graph 400 of accumulated penalty for two states in accordance with an embodiment of the invention. The upper chart 402 shows the accumulated penalty for JRockit compared to the accumulated penalty for the RLS using two state features when running the test application with randomly appearing intervals. The lower chart 404 shows that the system still runs out of memory after ca 50000 time steps and hence has not learned all states that lead to running out of memory due to the increased amount of states and to the additional state feature not giving enough information, i.e. has not yet converged to a proper Q-function and policy.

Figure 18:
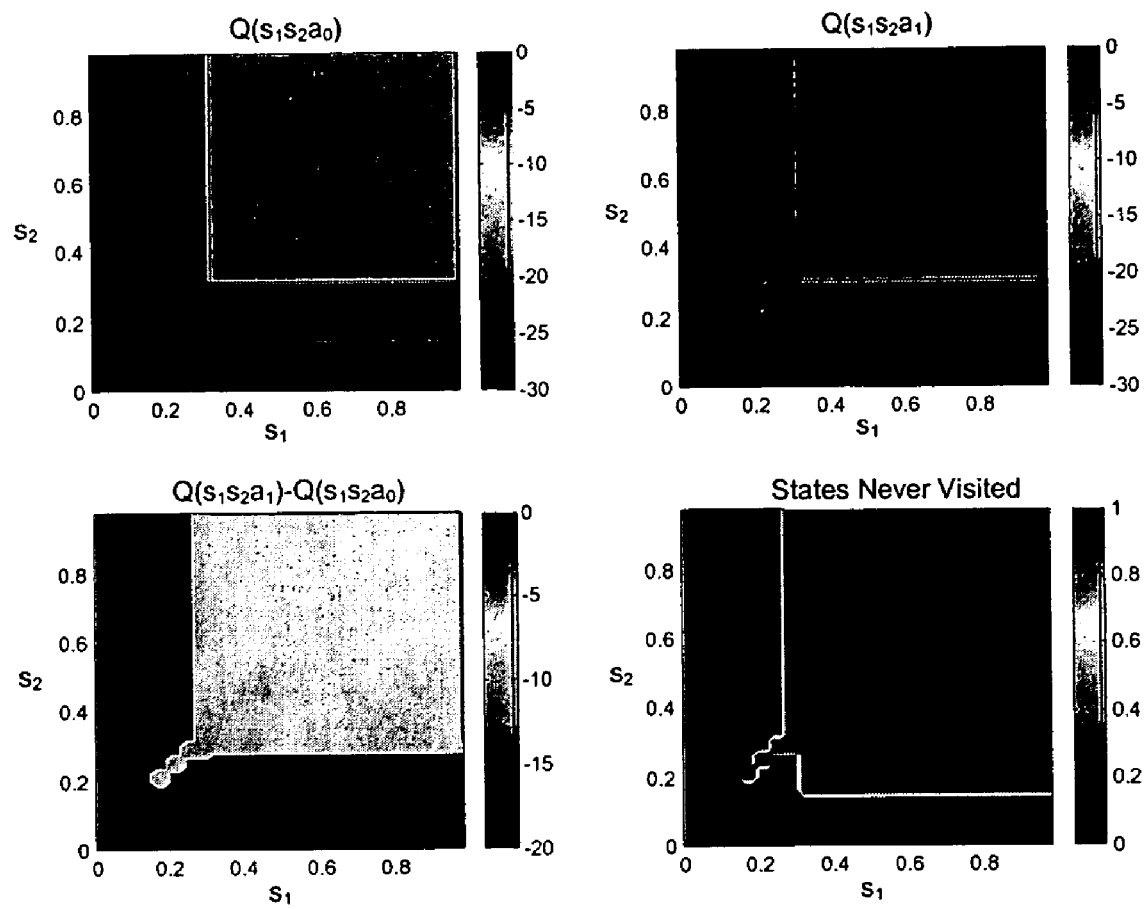
FIG. 18 shows a contour-plot of the Q-function at time step 2500, when the system has not yet run out of memory.
Figure 19:
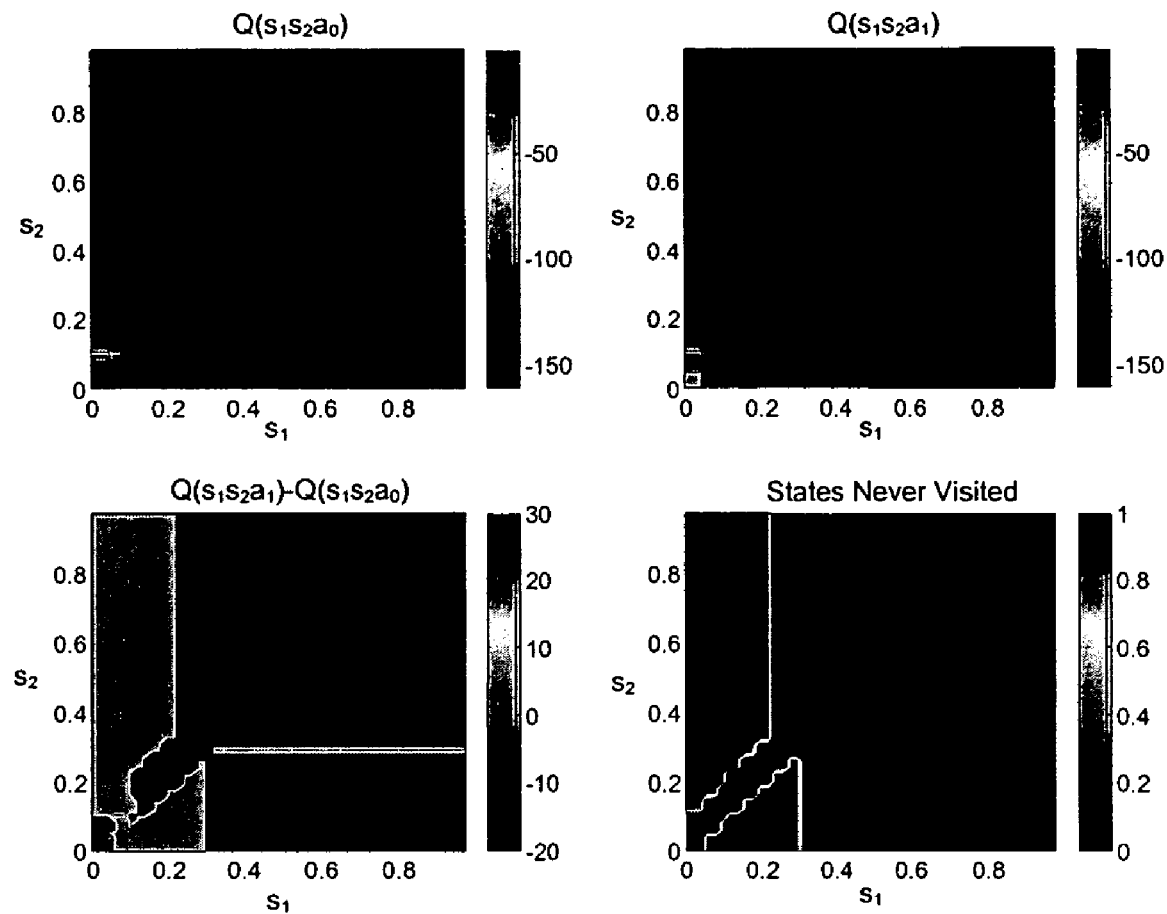
FIG. 19 shows a contour-plot of the Q-function at time step 10000, when the system has started to occasionally run out of memory.
Figure 20:
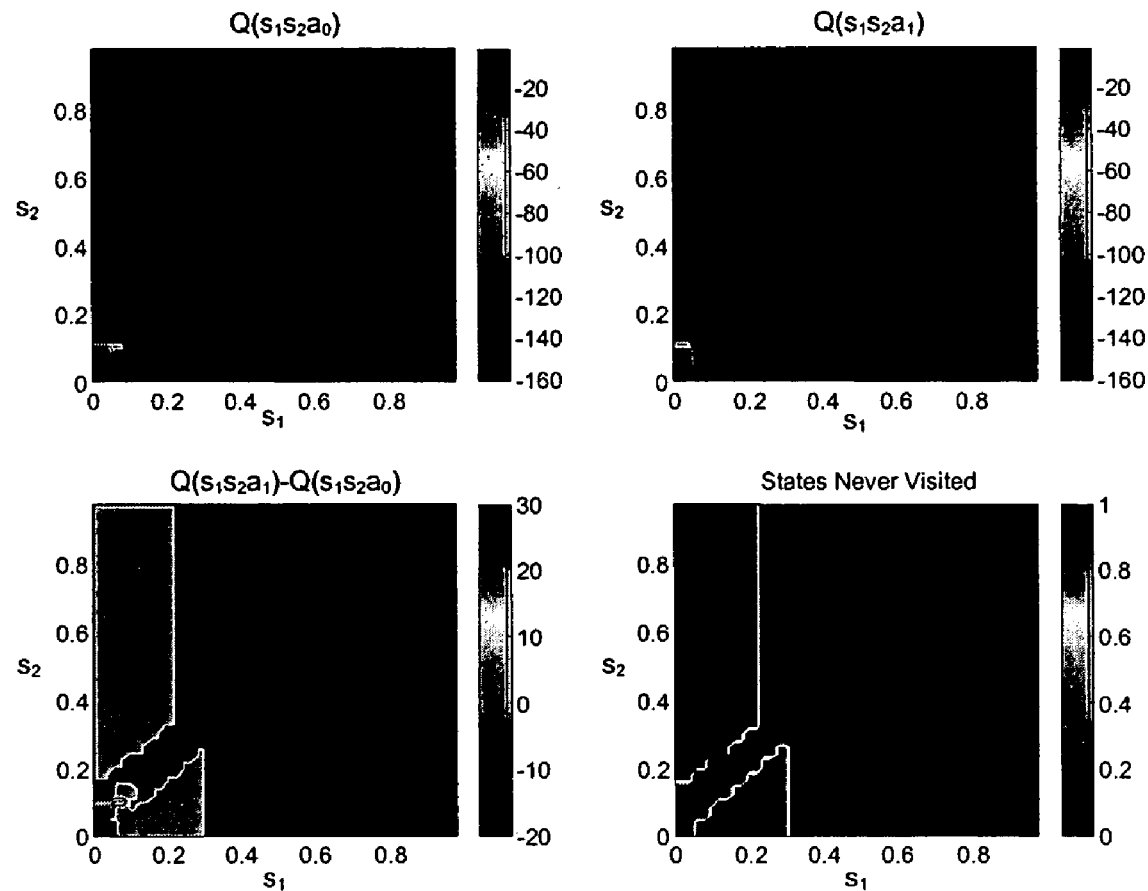
FIG. 20 shows a contour-plot of the Q-function at time step 50000, when the system has stopped learning.

Plots of the Q-function at different stages during the test session are illustrated in FIGS. 18, 19 and 20. In FIG. 18 the Q-function at time step 2500 is illustrated. At time step 2500 the system has not yet run out of memory and hence has not yet learned any state that leads to a penalty of –500. The Q-value for not performing a garbage collection is always better than the alternative action to perform a garbage collection. After about 10000 decisions (i.e. at time step 10000) the system encounters states in which it runs out of memory. This can be seen in FIG. 19 as in states of little memory available the Q-values for performing garbage collections are higher than those for not performing garbage collections. Whereas FIG. 19 illustrates the contour plots of the Q-function after 10000 time steps, FIG. 20 shows the same information after 50000 time steps. At this stage the Q-values did converge. It is interesting to observe that the part of the state space for which garbage collection is preferred is much smaller than in the case of only one state feature, where the decision boundary for s1 was about 12–14%.

Figure 21:
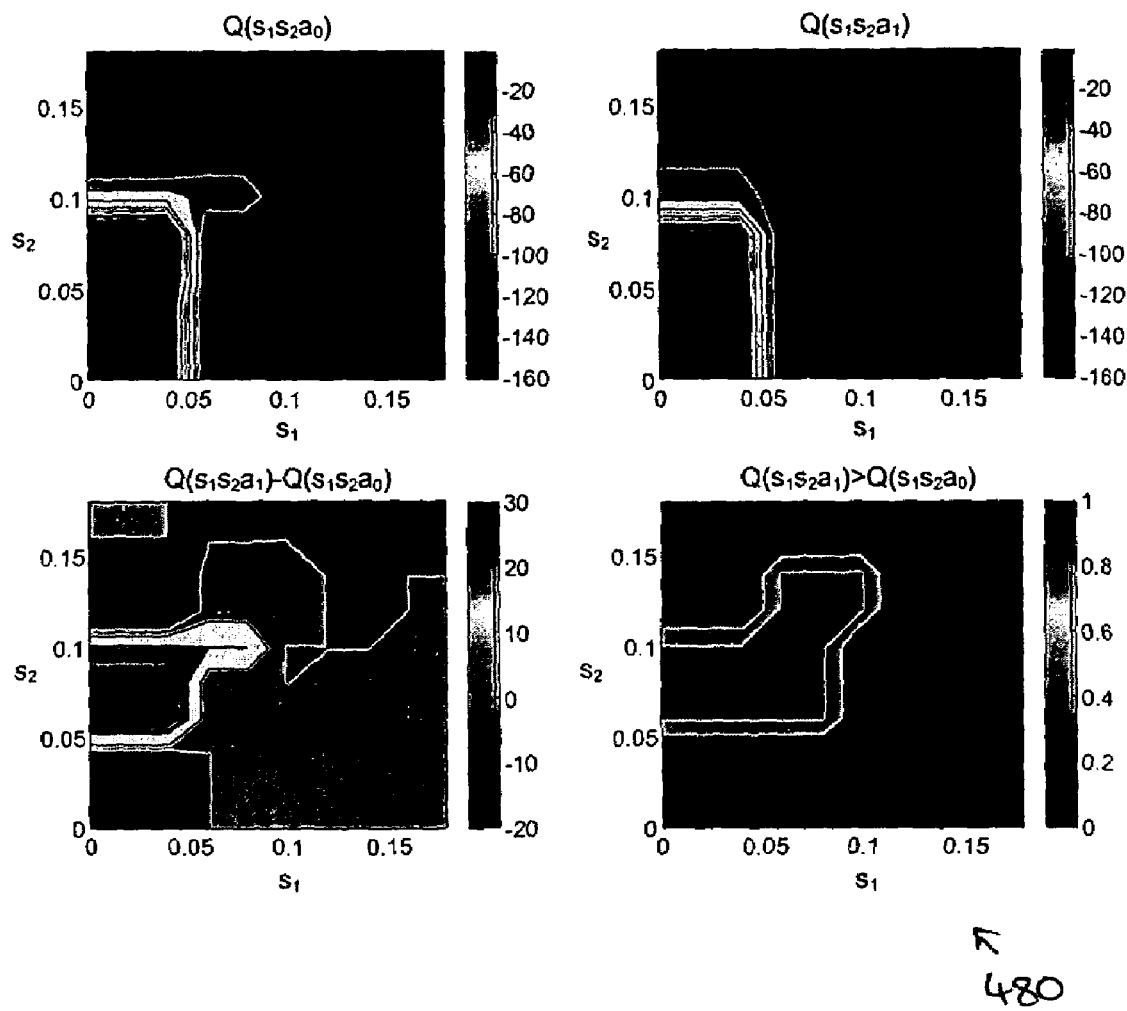
FIG. 21 shows an enlarged contour-plot of the Q-function at time step 50000, to be able to see the detailed decision boundary when s1 and s2<15%.

FIG. 21 is an enlarged region to show the details from the contour plots in FIG. 20, where $s_1$ and $s_2$<15%. As may be observed, $s_2$ plays some role, otherwise the decision boundary would be a line parallel to the y-axis. For example, the additional state feature seem to matter in the state $s_1$=10% and $s_2$=15%. This situation represents a high memory allocation rate (about 5%) and the Q-value for performing a garbage collection is higher than for not performing one. On the other hand, in the state s=10% and $s_2$=12% for which the memory allocation rate is low (about 2%), the action not to garbage collect has higher Q-value than the action garbage collect. Such a behavior is intuitively comprehensible, even though the entire decision boundary for even lower values of $s_1$ and $s_2$ cannot be explained satisfactorily. It might be that these states of very low memory ($s_1$, $s_2$<5%) are not visited at all once garbage collection is invoked for their successor states. Therefore, the Q-values for this part of the state space are not correct.

In all the plots above it can be observed that for high memory available the difference between the Q-values for performing a garbage collection and not performing a garbage collection is about 10, which matches exactly the penalty for performing a garbage collection. This makes sense insofar as the state after performing a garbage collection when the amount of memory available is high is also one of high memory available. It can also be seen that states for which $s_2$ is much smaller than $s_1$ never occur as the memory allocation rate is limited. This observation indicates that the memory allocation rate $s_{2-s1}$ is a better state feature to use than $s_2$ in some instances.

The decision boundary in the case where two state features were used is more complex than in the case when only one state feature was used. Basically there are more states in the former case, for which the RLS has to learn that it runs out of memory if it does not perform a garbage collection. A way of handling this problem can be to use more tilings, e.g. one for each state feature separately and one separate for the combination of the two state features.

Another problem to consider is that learning in those cases where two state features are considered seems to be more difficult, as the state space is more complex. The complexity depends on the increased number of states, which leads to the increased time it takes for the system to explore the state space. The system also runs out of memory more often due to the increased number of states to visit before learning an optimized behavior. Q-function approximation (i.e. tile coding, function approximation) can be used to provide a remedy to this problem.

Design Variations

Depending on the particular embodiment or implementation, several variations can be included in the system. The most important variation is to use additional state features for the decision process.

A second important aspect is to use more complex scenarios of memory allocation, in which the memory allocation behavior switches more rapidly. Other dimensions of the garbage collecting problem such as object size, levels of references between objects, among others can also be considered.

The issue of selecting proper test application environments also relates to the problem of generalization, i.e., how much does training on one particular application or a set of multiple applications help to perform well on unseen applications.

One technique for improving the system is to decrease the learning rate more slowly. The same suggestion applies to the probability for choosing a random action in order to achieve a better balance between exploitation and exploration. The optimal parameters are best determined by cross-validation.

An approach for achieving better results when more state features are taken into account is to represent the state features differently. For instance, as mentioned above, radial basis functions may be used for generalization of continuous state features. A better approach is to represent the state features with continuous values and instead use a gradient-descent method for approximating the Q-function.

A significant factor to consider is the amount of state features. A conventional JVM such as JRockit considers only one parameter for the decision of when to garbage collect. The performance of the RLS may be improved if additional state information is available. The potential strength of the RLS reveals itself better if the decision is based on more state features. The choice of what parameters to include is crucial to the performance.

Another important aspect to consider is online vs. offline performance.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while embodiments of the invention have been described herein with respect to implementation within or in comparison with a WebLogic or JRockit environment, that various embodiments and other implementations may also be used with other application servers, virtual machines, and environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for memory management comprising:
   a computer system including a virtual machine operating thereon;
   a memory space within said computer system and accessible by the virtual machine for the runtime storage and execution of applications; and,
   a garbage collector that uses a reinforcement learning process to control the allocation of memory to applications within the memory space;
   wherein the garbage collector performs the steps of
   (a) measuring system-wide and application-specific parameters, and system events, to determine a current state of the memory space, including the degree of fragmentation in the memory space,
   (b) performing an action to adjust the allocation of memory in the memory space, including garbage collecting the memory space,
   (c) calculating a reward value that indicates the success of the action on the memory space, including adding or subtracting preset values for specified actions of the garbage collector or conditions of the memory space,
   (d) storing information about the state, action and reward value for subsequent use by the garbage collector,
   (e) subsequently measuring the system-wide and application-specific parameters, and system events, to determine a new state of the memory space,
   (f) retrieving and using the stored information about the state, action and reward value to determine an optimal action that the garbage collector should perform on the memory space to maximize a likely future reward value,
   (g) performing the determined action by the garbage collector to adjust the allocation of memory,
   (h) calculating a new reward value that indicates the success of the determined action on the memory space, and,
   (i) repeating steps (d) through (h) to control the allocation of memory to applications within the memory space.

2. The system of claim 1 wherein the virtual machine is a Java Virtual Machine.

3. The system of claim 1 wherein the reinforcement learning uses a temporal difference method.

4. The system of claim 3 wherein the temporal difference method uses an on-policy SARSA algorithm that uses the information about the state, action and reward value to first determine an optimal action that the garbage collector should perform, and then updates the information about the new state, action and reward value, for subsequent use in determining additional actions.

5. The system of claim 1, wherein the system-wide and application-specific parameters used to determine the current state include the amount of memory allocated by the system within a particular time unit.

6. The system of claim 1, wherein the system-wide and application-specific parameters used to determine a current state include the amount of allocated memory the last time a decision to garbage collect was made.

7. The system of claim 1, wherein the system-wide and application-specific parameters used to determine a current state include how much of the memory space is fragmented.

8. The system of claim 1, wherein the system-wide and application-specific parameters used to determine a current state include any of the average size of new allocated objects, average age of allocated objects, or average amount of new allocated objects.

9. The system of claim 1, wherein the system events that contribute to the current state and for which preset reward values are associated include any of whether a garbage collection was made during the last time step, whether the system ran out of memory during the last time step, the amount of occupied memory before the garbage collection, the amount of occupied memory left after completed garbage collection, or whether the garbage collector made a heap lock during the last time step.

10. The system of claim 1, wherein the actions by the garbage collector to adjust the allocation of memory include whether to garbage collect or not, whether to extend or compact the memory space, and by how much.

11. A method for memory management comprising the steps of:
    analyzing the memory space of a computer system or virtual machine; and,
    using a garbage collector together with a reinforcement learning process to control the allocation of memory to applications within the memory space
    wherein the garbage collector performs the steps of
    (a) measuring system-wide and application-specific parameters, and system events, to determine a current state of the memory space, including the degree of fragmentation in the memory space,
    (b) performing an action to adjust the allocation of memory in the memory space, including garbage collecting the memory space, (c) calculating a reward value that indicates the success of the action on the memory space, including adding or subtracting preset values for specified actions of the garbage collector or conditions of the memory space, (d) storing information about the state, action and reward value for subsequent use by the garbage collector, (e) subsequently measuring the system-wide and application-specific parameters, and system events, to determine a new state of the memory space, (f) retrieving and using the stored information about the state, action and reward value to determine an optimal action that the garbage collector should perform on the memory space to maximize a likely future reward value, (g) performing the determined action by the garbage collector to adjust the allocation of memory, (h) calculating a new reward value that indicates the success of the determined action on the memory space, and, (i) repeating steps (d) through (h) to control the allocation of memory to applications within the memory space.

12. The method of claim 11 wherein the virtual machine is a Java Virtual Machine.

13. The method of claim 11 wherein the reinforcement learning uses a temporal difference method.

14. The method of claim 13 wherein the temporal difference method uses an on-policy SARSA algorithm that uses the information about the state, action and reward value to first determine an optimal action that the garbage collector should perform, and then updates the information about the new state, action and reward value, for subsequent use in determining additional actions.

15. The method of claim 11, wherein the system-wide and application-specific parameters used to determine the current state include the amount of memory allocated by the system within a particular time unit.

16. The method of claim 11, wherein the system-wide and application-specific parameters used to determine a current state include the amount of allocated memory the last time a decision to garbage collect was made.

17. The method of claim 11, wherein the system-wide and application-specific parameters to used determine a current state include how much of the memory space is fragmented.

18. The method of claim 11, wherein the system-wide and application-specific parameters used to determine a current state include any of the average size of new allocated objects, average age of allocated objects, or average amount of new allocated objects.

19. The method of claim 11, wherein the system events that contribute to the current state and for which preset reward values are associated include any of whether a garbage collection was made during the last time step, whether the system ran out of memory during the last time step, the amount of occupied memory before the garbage collection, the amount of occupied memory left after completed garbage collection, or whether the garbage collector made a heap lock during the last time step.

20. The method of claim 11, wherein the actions by the garbage collector to adjust the allocation of memory include whether to garbage collect or not, whether to extend or compact the memory space, and by how much.

* * * * *